US009872040B2

United States Patent
Pu et al.

(10) Patent No.: US 9,872,040 B2
(45) Date of Patent: Jan. 16, 2018

(54) COLOR INDEX CODING FOR PALETTE-BASED VIDEO CODING

(71) Applicant: QUALCOMM Incorporated, San Diego, CA (US)

(72) Inventors: Wei Pu, San Diego, CA (US); Marta Karczewicz, San Diego, CA (US); Joel Sole Rojals, La Jolla, CA (US); Liwei Guo, San Diego, CA (US); Rajan Laxman Joshi, San Diego, CA (US); Feng Zou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 14/586,805

(22) Filed: Dec. 30, 2014

(65) Prior Publication Data
US 2015/0189302 A1     Jul. 2, 2015

Related U.S. Application Data

(60) Provisional application No. 61/923,163, filed on Jan. 2, 2014, provisional application No. 61/924,141, filed on
(Continued)

(51) Int. Cl.
*H04N 19/583* (2014.01)
*H04N 19/124* (2014.01)
(Continued)

(52) U.S. Cl.
CPC ......... *H04N 19/583* (2014.11); *H04N 19/124* (2014.11); *H04N 19/127* (2014.11);
(Continued)

(58) Field of Classification Search
CPC .. H04N 19/583; H04N 19/124; H04N 19/127; H04N 19/14; H04N 19/176;
(Continued)

(56) References Cited

U.S. PATENT DOCUMENTS 5,847,767 A     12/1998 Ueda
6,707,939 B1 *  3/2004 Weinholz ............... G06T 9/005
                                                                382/164
(Continued)

OTHER PUBLICATIONS

Wiegand et al., "WD1: Working Draft 1 of High-Efficiency Video Coding," JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.
(Continued)

*Primary Examiner* — William C Vaughn, Jr.
*Assistant Examiner* — Jae N Noh

(57) ABSTRACT

In palette-based coding, a video coder may form a so-called "palette" as a table of colors representing the video data of a given block. The video coder may code index values for one or more pixels values of a current block of video data, where the index values indicate entries in the palette that represent the pixel values of the current block. A method includes determining a number of entries in a palette, and determining whether a block of video data includes any escape pixels not associated with any entry in the palette. The method includes responsive to determining that the number of entries is one, and that the block does not include any escape pixels, bypassing decoding index values for the pixel values of the block, and determining the pixel values of the block to be equal to the one entry in the palette.

20 Claims, 7 Drawing Sheets

Related U.S. Application Data on Jan. 6, 2014, provisional application No. 61/969,759, filed on Mar. 24, 2014.

(51) Int. Cl.

| | |
|---|---|
| H04N 19/14 | (2014.01) |
| H04N 19/46 | (2014.01) |
| H04N 19/593 | (2014.01) |
| H04N 19/176 | (2014.01) |
| H04N 19/127 | (2014.01) |
| H04N 19/18 | (2014.01) |
| H04N 19/94 | (2014.01) |
| H04N 19/93 | (2014.01) |

(52) U.S. Cl.
CPC ........... *H04N 19/14* (2014.11); *H04N 19/176* (2014.11); *H04N 19/18* (2014.11); *H04N 19/46* (2014.11); *H04N 19/593* (2014.11); *H04N 19/94* (2014.11); *H04N 19/93* (2014.11)

(58) Field of Classification Search
CPC ...... H04N 19/18; H04N 19/46; H04N 19/593; H04N 19/94; H04N 19/93
USPC .................................................. 375/240.24
See application file for complete search history.

(56) References Cited

U.S. PATENT DOCUMENTS

| | | | | |
|---|---|---|---|---|
| 2011/0188747 | A1* | 8/2011 | Ogura ....................... | G06K 9/36 382/166 |
| 2011/0311151 | A1 | 12/2011 | Tamatani et al. | |
| 2013/0121573 | A1 | 5/2013 | Shen et al. | |
| 2015/0189319 | A1* | 7/2015 | Pu ........................ | H04N 19/176 375/240.03 |
| 2015/0229933 | A1* | 8/2015 | Guo ...................... | H04N 19/103 375/240.02 |
| 2015/0341643 | A1* | 11/2015 | Xu ........................ | H04N 19/593 375/240.02 |
| 2016/0316214 | A1 | 10/2016 | Gisquet et al. | |
| 2017/0019672 | A1 | 1/2017 | Kim et al. | |

OTHER PUBLICATIONS

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.

Wiegand et al., "WD3: Working Draft 3 of High-Efficiency Video Coding," Document JCTVC-E603, 5th Meeting: Geneva, CH, Mar. 16-23, 2011, (Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16); JCTVC-7803_d2, Oct. 4, 2011, 226 pp.

Bross et al., "WD5: Working Draft 5 of High-Efficiency Video Coding," 7th Meeting: Geneva, CH, Nov. 21-30, 2011, (Joint Collaborative Team on Video Coding of ISO/IEC JTC1/SC29/WG11 and ITU-T SG.16); JCTVC-G1103_d2, Dec. 30, 2011, 214 pp.

Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.

Bross et al., "High efficiency video coding (HEVC) text specification draft 7," 9th Meeting: Geneva, CH, Apr. 27-May 1, 2012, (Joint Collaborative Team on Video Coding of ISO/IEC JTC1/SC29/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.

Bross et al., "High Efficiency Video Coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.

Bross et al., "High Efficiency Video Coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Flynn et al., "BoG report on Range Extensions topics," JCT-VC Meeting; Oct. 23-Nov. 1, 2013; Geneva, CH; (Joint Collaborative Team on Video Coding of ISO/IEC JTC1/SC29/WG11 and ITU-T SG.16); URL: http://wftp3.itu.int/av-arch/jctvc-site/, No. JCTVC-00352, Nov. 1, 2013, pp. 1-49, XP030115433, 49 pp. [uploaded in parts].

Guo et al., "AHG8: Major-color-based screen content coding," JCT-VC Meeting; Oct. 23-Nov. 1, 2013; Geneva, CH; (Joint Collaborative Team on Video Coding of ISO/IEC JTC1/SC29/WG11 and ITU-T SG.16); URL: http://wftp3.itu.int/av-arch/jctvc-site/, No. JCTVC-00182, Oct. 14, 2013, XP030115218, 7 pp.

Kim et al., "High Efficiency Video Coding (HEVC) Test Model 12 (HM12) Encoder Description," JCT-VC Meeting; Jul. 25-Aug. 2, 2013; Vienna, AT; (Joint Collaborative Team on Video Coding of ISO/IEC JTC1/SC29/WG11 and ITU-T SG.16); URL: http://wftp3.itu.int/av-arch/jctvc-site/, No. JCTVC-N1002, Oct. 21, 2013, XP030114946, 36 pp.

Lai et al., "Non-CE6: Syntax redundancy removal for palette mode with one index value," JCT-VC Meeting; Oct. 17-24, 2014; Strasbourg, FR; (Joint Collaborative Team on Video Coding of ISO/IEC JTC1/SC29/WG11 and ITU-T SG.16); URL: http://wftp3.itu.int/av-arch/jctvc-site/, No. JCTVC-S0099-r2, Oct. 19, 2014; XP030116848, 2 pp.

Laroche et al., "SCCE3 Test B.7: palette run coding," JCT-VC Meeting; Jun. 30-Jul. 9, 2014; Sapporo, JP; (Joint collaborative Team on Video Coding of ISO/IEC JTC1/SC29/WG11 and ITU-T SG.16); URL: http://wftp3.itu.int/av-arch/jctvc-site/, No. JCTVC-R0085, Jun. 20, 2014, XP030116337, 9 pp.

Pan et al., "A Low-Complexity Screen Compression Scheme for Interactive Screen Sharing," IEEE Transactions on Circuits and Systems for Video Technology, IEEE Service Center, Piscataway, NJ, US, vol. 23, No. 6, Jun. 2013, XP011513107, pp. 949-960.

Pu et al., "Non-CE6: Syntax Redundancy Fixes for Palette Mode," JCT-VC Meeting; Oct. 17-24, 2014; Strasbourg, FR; (Joint Collaborative Team on Video Coding of ISO/IEC JTC1/SC29/WG11 and ITU-T SG.16); URL: http://wftp3.itu.int/av-arch/jctvc-site/, No. JCTVC-S0110-r1, Oct. 21, 2014; XP030116863, 7 pp.

Pu et al., "Non-RCE4: Refinement of the palette in RCE4 Test 2," JCT-VC Meeting; Jan. 9-17, 2014; San Jose, CA, US; (Joint Collaborative Team on Video Coding of ISO/IEC JTC1/SC29/WG11 and ITU-T SG.16); URL: http://wftp3.itu.int/av-arch/jctvc-site/, No. JCTVC-P0231, Jan. 7, 2014, XP030115773, 4 pp.

(56) References Cited

OTHER PUBLICATIONS

International Search Report and Written Opinion from International Application No. PCT/US2014/072994, dated Apr. 21, 2015, 13 pp.

Response to Written Opinion dated Apr. 21, 2015, from International Application No. PCT/US2014/072994, filed on Oct. 30, 2015, 6 pp.

Second Written Opinion from International Application No. PCT/US2014/072994, dated Dec. 11, 2015, 6 pp.

Response to Second Written Opinion dated Dec. 11, 2015, from International Application No. PCT/US2014/072994, filed on Feb. 10, 2016, 14 pp.

International Preliminary Report on Patentability from International Application No. PCT/US2014/072994, dated Mar. 10, 2016, 16 pp.

* cited by examiner

COLOR INDEX CODING FOR PALETTE-BASED VIDEO CODING

This application claims the benefit of:
U.S. Provisional Patent Application No. 61/923,163, filed 2 Jan. 2014;
U.S. Provisional Patent Application No. 61/924,141, filed 6 Jan. 2014; and
U.S. Provisional Application No. 61/969,759, filed 24 Mar. 2014, the entire contents of each of which are incorporated herein by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

A multiview coding bitstream may be generated by encoding views, e.g., from multiple perspectives. Some three-dimensional (3D) video standards have been developed that make use of multiview coding aspects. For example, different views may transmit left and right eye views to support 3D video. Alternatively, some 3D video coding processes may apply so-called multiview plus depth coding. In multiview plus depth coding, a 3D video bitstream may contain not only texture view components, but also depth view components. For example, each view may comprise one texture view component and one depth view component.

SUMMARY

In general, techniques of this disclosure relate to palette-based video coding. In palette-based coding, a video coder (e.g., a video encoder or a video decoder) may form a so-called "palette" as a table of colors or pixel values representing the video data of a particular area (e.g., a given block). In this way, rather than coding actual pixel values or their residuals for a current block of video data, the video coder may code color or palette index values for one or more of the pixels values of the current block, where the index values indicate entries in the palette that are used to represent the pixel values of the current block. A map of palette index values for a current block of video data may be coded line by line using a given scan order and run-length coding techniques. Each of the index values in a given line of the map may be explicitly coded, predicted from a left-mode index of the given line, or predicted from a collocated index in a line above the given line.

Various techniques of this disclosure are directed to enhancing existing palette-based coding techniques. In some aspects, this disclosure is directed to techniques for bypassing coding of a map of palette index values for a block, if the block meets certain criteria. In some aspects, this disclosure is directed to determining a maximum range of values (also referred to herein as an "error limit") for a given palette using a mapping table that stores a relationship between quantization parameter values and palette error limits. In some aspects, this disclosure is directed to defining a quantization parameter for pixels of a palette-coded block that do not map to an entry in the corresponding palette (referred to herein as "escape pixels") based on quantization parameters used for traditional coefficient coding in a corresponding color channel.

In one example, this disclosure is directed to a method of decoding video data, the method including determining a number of entries included in a palette used to represent pixel values of a block of video data to be decoded, and determining whether the block of video data includes at least one escape pixel that is not associated with any of the entries in the palette. The method may further include responsive to determining that the number of entries included in the palette is equal to one and that the block of video data does not include at least one escape pixel, bypassing decoding of index values associated with the palette for the pixel values of the block of video data, and determining the pixel values of the block of video data to be equal to the one entry included in the palette.

In another example, this disclosure is directed to a method of encoding video data, the method including determining a number of entries included in a palette used to represent pixel values of a block of video data to be encoded, and determining whether the block of video data includes at least one escape pixel that is not associated with any of the entries in the palette. The method may further include responsive to determining that the number of entries included in the palette is equal to one and that the block of video data does not include at least one escape pixel, bypassing encoding of index values associated with the palette for the pixel values of the block of video data, and encoding the block of video data by determining the pixel values of the block of video data to be equal to the one entry included in the palette.

In another example, this disclosure is directed to an apparatus for decoding video data, the apparatus comprising a memory configured to store video data, and one or more processors configured to determine a number of entries included in a palette used to represent pixel values of a block of video data to be coded, and to determine whether the block of video data includes at least one escape pixel that is not associated with any of the entries in the palette. The one or more processors may further be configured to responsive to a determination that the number of entries included in the palette is equal to one and that the block of video data does not include at least one escape pixel, bypass coding of index values associated with the palette for the pixel values of the block of video data, and to determine the pixel values of the block of video data to be equal to the one entry included in the palette.

In another example, this disclosure is directed toward an apparatus for coding video data, the apparatus comprising means for determining a number of entries included in a palette used to represent pixel values of a block of video data to be coded, and means for determining whether the block of video data includes at least one escape pixel that is not associated with any of the entries in the palette. The apparatus may further include means for bypassing, responsive to determining that the number of entries included in the palette is equal to one and that the block of video data does not include at least one escape pixel, coding of index values associated with the palette for the pixel values of the block of video data and means for determining the pixel values of the block of video data to be equal to the one entry included in the palette.

In another example, this disclosure is directed toward a non-transitory computer-readable medium encoded with instructions that that, when executed, cause one or more processors of a device for coding video data to determine a number of entries included in a palette used to represent pixel values of a block of video data to be coded, and to determine whether the block of video data includes at least one escape pixel that is not associated with any of the entries in the palette. The instructions, when executed, may further cause the one or more processors to responsive to a determination that the number of entries included in the palette is equal to one and that the block of video data does not include at least one escape pixel, bypass coding of index values associated with the palette for the pixel values of the block of video data, and to determine the pixel values of the block of video data to be equal to the one entry included in the palette.

In one example, this disclosure is directed to a method of decoding video data, the method including determining a palette used to represent pixel values of a block of video data to be decoded, and identifying, in the block of video data, one or more escape pixels that are not associated with any of one or more entries in the palette. The method may further include identifying a single quantization parameter (QP) value for all of the one or more escape pixels of the block for a given color channel based on a QP value used for transform coefficient coding in non-palette based coding, and dequantizing each of the one or more escape pixels using the identified single QP value. The method may further include determining the pixel values of the block of video data based on the dequantized escape pixels and index values received for one or more pixels in the block of video data that are associated with the one or more entries in the palette.

In another example, this disclosure is directed to a method of encoding video data, the method including determining a palette used to represent pixel values of a block of video data to be encoded, and identifying, in the block of video data, one or more escape pixels that are not associated with any of the one or more entries in the palette. The method may further include identifying a single quantization parameter (QP) value for all of the one or more escape pixels of the block for a given color channel based on a QP value used for transform coefficient coding in non-palette based coding, and quantizing each of the one or more escape pixels using the identified single QP value. The method may further include encoding the pixel values of the block of video data including the quantized escape pixels and index values for one or more pixels in the block of video data that are associated with the one or more entries in the palette.

In another example, this disclosure is directed to an apparatus for coding video data, the apparatus comprising a memory configured to store video data, and one or more processors in communication with the memory and configured to determine a palette used to represent pixel values of a block of video data to be coded, and to identify, in the block of video data, one or more escape pixels that are not associated with any of one or more entries in the palette. The one or more processors may be further configured to identify a single quantization parameter (QP) value for all of the one or more escape pixels of the block for a given color channel based on a QP value used for transform coefficient coding in non-palette based coding, and to apply the identified single QP value to each of the one or more escape pixels. The one or more processors may be further configured to determine the pixel values of the block of video data based on the escape pixels and index values received for one or more pixels in the block of video data that are associated with the one or more entries.

In another example, this disclosure is directed toward an apparatus for coding video data, the apparatus comprising means for means for determining a palette used to represent pixel values of a block of video data to be coded, means for identifying, in the block of video data, one or more escape pixels that are not associated with any of one or more entries in the palette, means for identifying a single quantization parameter (QP) value for all of the one or more escape pixels of the block for a given color channel based on a QP value used for transform coefficient coding in non-palette based coding, means for applying the identified single QP value to each of the one or more escape pixels, and means for determining the pixel values of the block of video data based on the escape pixels and index values received for one or more pixels in the block of video data that are associated with the one or more entries.

In another example, this disclosure is directed toward a non-transitory computer-readable medium encoded with instructions that that, when executed, cause one or more processors a device for coding video data to determine a palette used to represent pixel values of a block of video data to be coded, to identify, in the block of video data, one or more escape pixels that are not associated with any of one or more entries in the palette, and to identify a single quantization parameter (QP) value for all of the one or more escape pixels of the block for a given color channel based on a QP value used for transform coefficient coding in non-palette based coding. The instructions, when executed, may further cause the one or more processors to apply the identified single QP value to each of the one or more escape pixels, and to determine the pixel values of the block of video data based on the escape pixels and index values received for one or more pixels in the block of video data that are associated with the one or more entries.

The techniques described herein may provide one or more potential advantages and improvements over existing palette-based coding techniques and/or data compression techniques. For instance, various techniques of this disclosure may be implemented by video coding devices to conserve computing resources and bandwidth requirements, while maintaining data precision. Additionally, various techniques of this disclosure may be implemented by video coding devices to improve the efficiency and accuracy of existing palette-based coding techniques and data compression techniques.

The details of one or more examples of the disclosure are set forth in the accompanying drawings and the description below. Other features, objects, and advantages will be apparent from the description, drawings, and claims.

DETAILED DESCRIPTION

Figure 1:
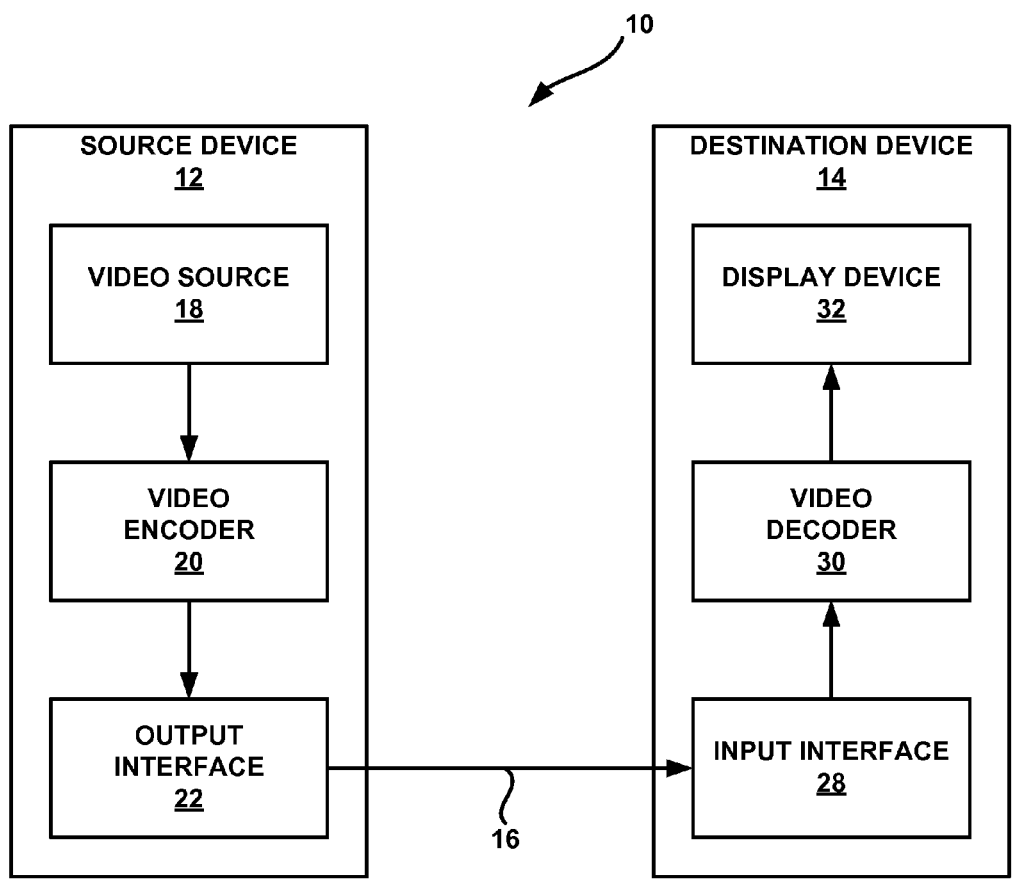
FIG. 1 is a block diagram illustrating an example video coding system that may utilize the techniques described in this disclosure.

This disclosure includes techniques for video coding and compression. In particular, this disclosure describes techniques for palette-based coding of video data. In traditional video coding, images are assumed to be continuous-tone and spatially smooth. Based on these assumptions, various tools have been developed, such as block-based transform, filtering, etc., and such tools have shown good performance for natural content videos.

In applications like remote desktop, collaborative work and wireless display, however, computer generated screen content (e.g., such as text or computer graphics) may be the dominant content to be compressed. This type of content tends to have discrete-tone, and feature sharp lines and high-contrast object boundaries. The assumption of continuous-tone and smoothness may no longer apply for screen content, and thus traditional video coding techniques may not be efficient ways to compress video data including screen content.

This disclosure describes palette-based coding, which may be particularly suitable for screen generated content coding. For example, assuming that a particular area of video data has a relatively small number of colors, a video coder (e.g., a video encoder or video decoder) may form a so-called "palette" to represent the video data of the particular area. The palette may be expressed as a table of colors or pixel values representing the video data of the particular area (e.g., a given block). For example, the palette may include the most dominant pixel values in the given block. In some cases, the most dominant pixel values may include the one or more pixel values that occur most frequently within the block. Additionally, in some cases, a video coder may apply a threshold value to determine whether a pixel value is to be included as one of the most dominant pixel values in the block. According to various aspects of palette-based coding, the video coder may code index values indicative of one or more of the pixels values of the current block, instead of coding actual pixel values or their residuals for a current block of video data. In the context of palette-based coding, the index values indicate respective entries in the palette that are used to represent individual pixel values of the current block.

For example, the video encoder may encode a block of video data by determining the palette for the block (e.g., coding the palette explicitly, predicting the palette, or a combination thereof), locating an entry in the palette to represent one or more of the pixel values, and encoding the block with index values that indicate the entry in the palette used to represent the pixel values of the block. In some examples, the video encoder may signal the palette and/or the index values in an encoded bitstream. In turn, the video decoder may obtain, from an encoded bitstream, a palette for a block, as well as index values for the individual pixels of the block. The video decoder may relate the index values of the pixels to entries of the palette to reconstruct the various pixel values of the block.

Palette-based coding of video data has been described in detail above. The basic idea of palette-based coding is that, for each CU, a palette is derived which comprises (and may consist of) the most dominant pixel values in the current CU. The size and the elements of the palette are first transmitted from a video encoder to a video decoder. After that, the pixel values in the CU are encoded according to a certain scanning order. For each pixel location in the CU, a flag, e.g., palette flag, is first transmitted to indicate if the pixel value is included in the palette (i.e., "run mode") or not (i.e., "pixel mode"). In "run mode," the palette index associated with the pixel location in the CU is signaled followed by a "run" of the pixel value. Neither palette flag nor the palette index needs to be transmitted for the following pixel locations that are covered by the "run" as they all have the same pixel value. In "pixel mode," the pixel value is transmitted for the given pixel location in the CU.

For each CU, a major color table is derived which consists of the most dominant pixel values in the current CU. The size and the elements of the table are first transmitted. The size and/or the elements of the major color table can be directly coded or predictively coded using the size and/or the elements of the major color table in the neighboring CUs (e.g. above and/or left coded CU).

In some examples, each of the pixels in the current CU is mapped to one major color table index. For those pixels whose major color indexes do not exist, a special index (named 'other index') is assigned to them and these pixels are called 'escaped pixel'. The techniques of this disclosure focus on the coding method of major color indexes.

An 'escape pixel' can be coded using any existing entropy coding method such as fixed length coding, unary coding, etc. A method to encode the escape values is using a left-shift operation depending on the quantization parameter (QP) value. That is, encode the most significant bits only, being the number of bits depending on the QP value. To that end, a strategy used in the state-of-the-art is to use a table that maps each QP to a number which is the right-shift to be applied to the pixel value.

The block of major color index is coded line by line. For each line, a line mode is chosen from 'horizontal', 'vertical', and 'normal'. If the 'horizontal' line mode is chosen, all of the indexes in the current line are the same as the left most index of the left most index in the above line. If the 'vertical' line mode is chosen, the entire line is copied from the one line above. If the 'normal' mode is selected, the indexes within the current line are coded one by one. For each index in this case, a syntax element is used to indicate whether the index can be copied from the collocated index in the above line ('copy_from_top'), or from the index's left neighbor index ('copy_from_left'), or no copy is possible ('no_copy'). If no copy is possible, the pixel is coded directly.

The examples above are intended to provide a general description of palette-based coding. In various examples, the techniques described in this disclosure may include techniques for various combinations of one or more of signaling encoded video data formed by palette-based coding modes, transmitting palettes, predicting palettes, deriving palettes, or decoding video data from palette-based coding maps and other syntax elements. Such techniques may improve video coding efficiency, e.g., requiring fewer bits to represent screen generated content.

This disclosure describes various techniques related to palette-based video coding. In some aspects, this disclosure is directed to bypassing coding a map of index values for a video block when a palette associated with the video block only includes one entry or color, and the video block does not include any escape pixels. In some aspects, this disclosure is directed to deriving a palette "error limit," which indicates a maximum deviation from a fixed pixel value that may be included within the corresponding palette, using a mapping table that stores a relationship between quantization parameter values and palette error limits. Some aspects of this disclosure are directed to deriving a quantization parameter (QP) for quantization and dequantization of an escape pixel (or the associated prediction error), using quantization parameters used for traditional coefficient coding in a corresponding color channel. Additionally, this disclosure describes the use of a flag to indicate whether a pixel that is included in a palette-based coded area is an escape pixel. Aspects of this disclosure also describe techniques to quantize an escape pixel value, such as techniques that employ a right-shift operation.

In some aspects, this disclosure is directed to quantizing escape pixels of a palette-coded block according to a mapping function (e.g., a shift function) based on a quantization parameter value for the escape pixel. In some aspects, this disclosure is directed to using a flag to indicate and/or determine whether a pixel of a palette-coded block is an escape pixel.

In some examples of this disclosure, the techniques for palette-based coding of video data may be used with one or more other coding techniques, such as techniques for inter-predictive coding or intra-predictive coding of video data. For example, as described in greater detail below, an encoder or decoder, or combined encoder-decoder (codec), may be configured to perform inter- and intra-predictive coding, as well as palette-based coding. In some examples, the palette-based coding techniques may be configured for use in one or more coding modes of High Efficiency Video Coding (HEVC). In other examples, the palette-based coding techniques can be used independently or as part of other existing or future systems or standards.

High Efficiency Video Coding (HEVC) is a new video coding standard developed by the Joint Collaboration Team on Video Coding (JCT-VC) of ITU-T Video Coding Experts Group (VCEG) and ISO/IEC Motion Picture Experts Group (MPEG). A recent draft of the HEVC standard, referred to as "HEVC Draft 10" of "WD10," is described in document JCTVC-L1003v34, Bross et al., "High Efficiency Video Coding (HEVC) Text Specification Draft 10 (for FDIS & Last Call)," Joint Collaborative Team on Video Coding (JCT-VC) of ITU-T SG16 WP3 and ISO/IEC JTC1/SC29/WG11, $12^{th}$ Meeting: Geneva, CH, 14-23 Jan. 2013, available from: http://phenix.int-evey.fr/jct/doc_end_user/documents/12_Geneva/wg11/JCTVC-L1003-v34.zip. The finalized HEVC standard document is published as "ITU-T H.265, SERIES H: AUDIOVISUAL AND MULTIMEDIA SYSTEMS Infrastructure of audiovisual services—Coding of moving video—High efficiency video coding," Telecommunication Standardization Sector of International Telecommunication Union (ITU), April 2013.

With respect to the HEVC framework, as an example, the palette-based coding techniques may be configured to be used as a coding unit (CU) mode. In other examples, the palette-based coding techniques may be configured to be used as a prediction unit (PU) mode in the framework of HEVC. Accordingly, all of the following disclosed processes described in the context of a CU mode may, additionally or alternatively, apply to PU. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding. Video encoder 20 and video decoder 30 of video coding system 10 represent examples of devices that may be configured to perform techniques for palette-based video coding in accordance with various examples described in this disclosure. For example, video encoder 20 and video decoder 30 may be configured to selectively code various blocks of video data, such as CUs or PUs in HEVC coding, using either palette-based coding or non-palette based coding. Non-palette based coding modes may refer to various inter-predictive temporal coding modes or intra-predictive spatial coding modes, such as the various coding modes specified by HEVC Draft 10.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode and store data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium. Thus, while video decoder 30 may be referred to as "receiving" certain information, the receiving of information does not necessarily occur in real- or near-real-time and may be retrieved from a medium at some time after storage.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

In some examples, video encoder 20 and video decoder 30 operate according to a video compression standard, such as HEVC standard mentioned above, and described in HEVC Draft 10. In addition to the base HEVC standard, there are ongoing efforts to produce scalable video coding, multiview video coding, and 3D coding extensions for HEVC. In addition, palette-based coding modes, e.g., as described in this disclosure, may be provided for extension of the HEVC standard. In some examples, the techniques described in this disclosure for palette-based coding may be applied to encoders and decoders configured to operation according to other video coding standards, such as the ITU-T-H.264/AVC standard or future standards. Accordingly, application of a palette-based coding mode for coding of coding units (CUs) or prediction units (PUs) in an HEVC codec is described for purposes of example.

In HEVC and other video coding standards, a video sequence typically includes a series of pictures. Pictures may also be referred to as "frames." A picture may include three sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in the raster scan. A coded slice may comprise a slice header and slice data. The slice header of a slice may be a syntax structure that includes syntax elements that provide information about the slice. The slice data may include coded CTUs of the slice.

This disclosure may use the term "video unit" or "video block" or "block" to refer to one or more sample blocks and syntax structures used to code samples of the one or more blocks of samples. Example types of video units or blocks may include CTUs, CUs, PUs, transform units (TUs), macroblocks, macroblock partitions, and so on. In some contexts, discussion of PUs may be interchanged with discussion of macroblocks or macroblock partitions.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector (MV). When video encoder 20 uses bi-prediction to generate the predictive blocks for a PU, the PU may have two MVs.

After video encoder 20 generates predictive blocks (e.g., predictive luma, Cb and Cr blocks) for one or more PUs of a CU, video encoder 20 may generate residual blocks for the CU. Each sample in a residual block of the CU may indicate a difference between a sample in a predictive block of a PU of the CU and a corresponding sample in a coding block of the CU. For example, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the residual blocks (e.g., luma, Cb and Cr residual blocks) of a CU into one or more transform blocks (e.g., luma, Cb and Cr transform blocks). A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a transform block to generate a coefficient block for a TU. A coefficient block may be a two-dimensional array of transform coefficients. A transform coefficient may be a scalar quantity. For example, video encoder 20 may apply one or more transforms to a luma transform block of a TU to generate a luma coefficient block for the TU. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encoding syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream. The bitstream may also include syntax elements that are not entropy encoded.

Video encoder 20 may output a bitstream that includes the entropy-encoded syntax elements. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for supplemental enhancement information (SEI), and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may obtain syntax elements from the bitstream. For example, video decoder 30 may parse the bitstream to decode syntax elements from the bitstream. Video decoder 30 may reconstruct the pictures of the video data based at least in part on the syntax elements obtained (e.g., decoded) from the bitstream. The process to reconstruct the video data may be generally reciprocal to the process performed by video encoder 20. For instance, video decoder 30 may use MVs of PUs to determine predictive sample blocks (i.e., predictive blocks) for the PUs of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture.

In some examples, video encoder 20 and video decoder 30 may be configured to perform palette-based coding. For example, in palette based coding, rather than performing the intra-predictive or inter-predictive coding techniques described above, video encoder 20 and video decoder 30 may code a so-called palette as a table of colors or pixel values representing the video data of a particular area (e.g., a given block). In this way, rather than coding actual pixel values or their residuals for a current block of video data, the video coder may code index values for one or more of the pixels values of the current block, where the index values indicate entries in the palette that are used to represent the pixel values of the current block.

For example, video encoder 20 may encode a block of video data by determining a palette for the block, locating an entry in the palette having a value representative of the value of one or more individual pixels of the block, and encoding the block with index values that indicate the entry in the palette used to represent the one or more individual pixel values of the block. Additionally, video encoder 20 may signal the index values in an encoded bitstream. In turn, a video decoding device (e.g., video decoder 30) may obtain, from the encoded bitstream, the palette for a block, as well as index values used for determining the various individual pixels of the block using the palette. Video decoder 30 may match the index values of the individual pixels to entries of the palette to reconstruct the pixel values of the block. In instances where the index value associated with an individual pixel does not match any index value of the corresponding palette for the block, video decoder 30 may identify such a pixel as an escape pixel, for the purposes of palette-based coding.

In another example, video encoder 20 may encode a block of video data according to the following operations. Video encoder 20 may determine prediction residual values for individual pixels of the block, determine a palette for the block, and locate an entry (e.g., index value) in the palette having a value representative of the value of one or more of the prediction residual values of the individual pixels. Additionally, video encoder 20 may encode the block with index values that indicate the entry in the palette used to represent the corresponding prediction residual value for each individual pixel of the block. Video decoder 30 may obtain, from an encoded bitstream signaled by source device 12, a palette for a block, as well as index values for the prediction residual values corresponding to the individual pixels of the block. As described, the index values may correspond to entries in the palette associated with the current block. In turn, video decoder 30 may relate the index values of the prediction residual values to entries of the palette to reconstruct the prediction residual values of the block. The prediction residual values may be added to the prediction values (for example, obtained using intra or inter prediction) to reconstruct the pixel values of the block.

As described in more detail below, the basic idea of palette-based coding is that, for a given block of video data to be coded, video encoder 20 may derive a palette that includes the most dominant pixel values in the current block. For instance, the palette may refer to a number of pixel values which are determined or assumed to be dominant and/or representative for the current CU. Video encoder 20 may first transmit the size and the elements of the palette to video decoder 30. Additionally, video encoder 20 may encode the pixel values in the given block according to a certain scanning order. For each pixel included in the given block, video encoder 20 may signal the index value that maps the pixel value to a corresponding entry in the palette. If the pixel value is not included in the palette (i.e., no palette entry exists that specifies a particular pixel value of the palette-coded block), then such a pixel is defined as an "escape pixel." In accordance with palette-based coding, video encoder 20 may encode and signal an index value that is reserved for an escape pixel. In some examples, video encoder 20 may also encode and signal the pixel value or a residual value (or quantized versions thereof) for an escape pixel included in the given block.

Upon receiving the encoded video bitstream signaled by video encoder 20, video decoder 30 may first determine the palette based on the information received from video encoder 20. Video decoder 30 may then map the received index values associated with the pixel locations in the given block to entries of the palette to reconstruct the pixel values of the given block. In some instances, video decoder 30 may determine that a pixel of a palette-coded block is an escape pixel, such as by determining that the pixel is palette-coded with an index value reserved for escape pixels. In instances where video decoder 30 identifies an escape pixel in a palette-coded block, video decoder 30 may receive the pixel value or a residual value (or quantized versions thereof) for an escape pixel included in the given block. Video decoder 30 may reconstruct the palette-coded block by mapping the individual pixel values to the corresponding palette entries, and by using the pixel value or residual value (or quantized versions thereof) to reconstruct any escape pixels included in the palette-coded block.

Palette-based coding may introduce an amount of signaling overhead. For example, a number of bits may be needed to signal characteristics of a palette, such as a size of the palette, as well as the palette itself. In addition, a number of bits may be needed to signal index values for the pixels of the block. For instance, according to existing palette-based coding techniques, even in cases where the palette is of limited size (e.g., a palette that includes just one entry), and a block does not include any escape pixels, video encoder 20 may still signal palette indices for the pixel values of the block, which will all be the same index value identifying the one entry in the palette, on a line-by-line basis for the video block. Additionally, existing palette-based coding techniques introduce signaling overhead in terms of signaling an index value to indicate an escape pixel, and then signaling the pixel value or residual value (or quantized versions thereof) for the escape pixel.

The techniques of this disclosure may, in some examples, reduce the number of bits needed to signal such information. For example, certain techniques described herein are directed to bypassing coding (e.g., encoding and/or decoding) of a map of index values for one or more pixels of a block if the block satisfies a particular set of conditions with respect to palette-based coding. In other examples, certain techniques described herein are generally directed to signaling less bits of data (e.g., a one-bit flag instead of a five-bit index value) to indicate that a given pixel is an escape pixel with respect to the palette for the current block. Various techniques of this disclosure are also directed to determining a range of pixel values that may be included in a palette for a given block. The range of pixel values that a palette may include is referred to herein as the palette's "error limit," and various techniques of this disclosure are directed to determining a palette's error limit based on the quantization parameter (QP) of the block associated with the palette.

Other aspects of this disclosure are directed to deriving quantized escape values. For instance, some of these aspects are directed to techniques for defining one or more quantization parameters with which to quantize an escape pixel. Still other aspects of this disclosure are directed to applying particular functions (e.g., a right-shift function) in quantizing an escape pixel value. In this manner, various aspects of this disclosure provide potential advantages, such as reducing bit overhead and mitigating resource usage, while maintaining picture quality and accuracy.

As described above, video encoder 20 may apply techniques of this disclosure to bypass encoding and signaling of a palette index for various individual pixels of a block under certain circumstances. According to aspects of this disclosure, video encoder 20 may bypass encoding and signaling of the palette index for a palette-coded block if video encoder 20 determines that all pixels of the block are of the same color. For instance, video encoder 20 may determine that a palette-coded CU of a picture is a "single color CU" and may bypass encoding and signaling of the palette index for the single color CU.

More specifically, video encoder 20 may determine whether a palette-coded CU is a single color CU if the current CU satisfies two conditions. The first condition that video encoder 20 may use in determining whether the palette-coded CU is a single color CU is whether the size of the corresponding palette is equal to one (1). If the size of the palette is equal to one, then video encoder 20 may determine that the first condition is met with respect to the palette-coded CU being a single color CU. More specifically, if the palette size is one, then video encoder 20 may determine that the palette includes only one color that corresponds to (non-escape) pixels of the palette-coded CU. In some examples where the palette size is one, video encoder 20 may determine that the only index value associated with the palette is zero (0).

If video encoder 20 determines that the palette size for the palette-coded CU is 1 (i.e., that the first condition is met), then video encoder 20 may determine whether the palette-coded CU meets a second condition to be a single color CU. The second condition that video decoder 30 may use in determining whether the palette-coded CU is a single color CU is that the palette-coded CU does not include any escape pixels. If the palette-coded CU includes at least one escape pixel, then video encoder 20 may determine that, even though the corresponding palette indicates only one color with respect to the palette-coded CU, the palette-coded CU includes pixels of two or more colors. For instance, the palette-coded CU may include at least one pixel that has the color indicated in the palette, and at least one escape pixel that has a different color.

If video encoder 20 determines that the palette-coded CU satisfies both of the conditions described above, then video encoder 20 may determine that the palette-coded CU is a single color CU. More specifically, if the palette-coded CU is associated with a single-entry palette (shown by the palette size of one), and the palette-coded CU does not include any escape pixels, then video encoder 20 may determine that all individual pixels of the palette-coded CU are of the same color (i.e., the color indicated by the single entry of the corresponding palette). In various implementations, video encoder 20 may apply the single color CU identification techniques described above with respect to a single color component basis with respect to the palette, or to a combined index that indicates more than one color component.

Responsive to determining that the palette-coded CU includes pixels of only one color (i.e., that the CU is a single color CU), video encoder 20 may implement techniques of this disclosure to bypass encoding and signaling the map of palette index values for the pixels of the single color CU. By bypassing the encoding and signaling of the map of palette index values for the pixels of the CU, video encoder 20 may conserve computing resources and bandwidth that would otherwise be expended for encoding and signaling color information for the CU. Instead of encoding and signaling an index for each individual pixel of the single color CU, video encoder 20 may implement techniques of this disclosure to more efficiently indicate (e.g., to video decoder 30), the color information for the entire set of pixels that make up the single color CU.

According to some examples of this disclosure, video encoder 20 may encode and signal a flag to indicate whether video encoder 20 bypassed encoding (and signaling) of the palette index values on a line-by-line basis for the single color CU. By encoding and signaling a one-bit flag for the entire CU instead of individual index values for each pixel of the CU, video encoder 20 may conserve computing resources and signaling bandwidth in comparison to existing palette-based coding techniques. Moreover, video encoder 20 may maintain accuracy and quality of the encoded single color CU, because the single-entry palette signaled by video encoder 20 for the CU includes the color information for all individual pixels of the CU. In various examples, video encoder 20 may encode and signal the flag in various ways, such as in a sequence parameter set (SPS), a picture parameter set (PPS), or a slice header. In various examples, video encoder 20 may encode and signal the flag on a per-CTU basis, a per-CU basis, or for a block of any block size, as well.

In examples where video encoder 20 bypasses encoding and signaling of the palette index value for individual pixels of a single color block that is palette-coded, video decoder 30 may apply various techniques of this disclosure to reconstruct the single color block. In some examples, video decoder 30 may perform operations reciprocal to those described above with respect to video encoder 20 to determine that the palette-coded block is a single color block. For instance, video decoder 30 may determine that the palette for the current block has a size of one, thereby determining that the block satisfies the first condition to qualify as a single color block. In various examples, video decoder 30 may receive the palette in an encoded video bitstream from video encoder 20, or may reconstruct the palette.

Additionally, video decoder 30 may determine that the block does not include any escape pixels, thereby determining that the block satisfies the second condition to qualify as a single color block. Based on determining that the size of the palette for the block is one (the first condition), and that the block does not include any escape pixels (the second condition), video decoder 30 may implement techniques of this disclosure to determine that the current block is a single color block. In this manner, video decoder 30 may implement techniques of this disclosure to reconstruct a palette-coded block accurately, while conserving computing resources and bandwidth that would otherwise be required to reconstruct the block by decoding a palette index on a pixel-by-pixel basis.

In other examples, video decoder 30 may receive, in the encoded video bitstream, a flag that indicates whether video encoder 20 bypassed encoding and signaling of the palette index for a palette-coded block, in accordance with techniques of this disclosure. In cases where video decoder 30 receives a flag indicating that video encoder 20 bypassed encoding and signaling of the map of palette index values for the palette-coded block, video decoder 30 may implement techniques of this disclosure to determine that the current block is palette-coded, and is a single color block. More specifically, if the flag is enabled (e.g., set to a value of one), video decoder 30 may determine that the palette-coded block is a single color block. In turn, video decoder 30 may implement techniques of this disclosure to reconstruct each pixel of the block according to the color information of the single entry in the palette for the block. In this manner, video decoder 30 may implement techniques of this disclosure to accurately reconstruct the palette-coded block using a one-bit flag for the entire block, rather than using separate index values (of varying bitdepth) for each individual pixel of the block.

In another example, video encoder 20 may implement techniques of this disclosure to derive an error limit for a palette for a palette-coded block. As used herein, the terms "error limit" or "palette error limit" may refer to the range of values (e.g., in terms of color information) that the entries of the palette can include. More specifically, the palette error limit defines a minimum variation in color value that different palette entries bear, or must display. As described above, in order to encode a block according to palette-based coding, video encoder 20 may construct the corresponding palette to include color values that occur most frequently (on a pixel-by-pixel basis) within the block.

In constructing a palette, video encoder 20 may determine that the various entries of the palette must display a minimum variation from one another. More specifically, video encoder 20 may construct the palette so that no two entries of the palette are sufficiently similar such that the two entries can be grouped as a single entry. If two possible palette entries are within the palette error limit, video encoder 20 may use one of the two entries to represent both entries in the palette.

However, if video encoder 20 determines that two entries (which occur commonly in the block) differ by at least the palette error limit, then video encoder 20 may include both entries in the palette. In examples where the entries are represented by three color components, video encoder 20 may include both entries in the palette if at the entries differ by at least the palette error limit with respect to at least one of the color components. For instance, if the palette error limit is set to a value of five (5), video encoder 20 may determine whether to include both entries in the palette (assuming both entries occur commonly enough in the block), based on the following Boolean expression: abs(A1−B1)>5||abs(A2−B2)>5||abs(A3−B3)>5, where "abs" represents a difference between color component parameters.

As described, video encoder 20 may construct a palette by clustering commonly-occurring (or relatively commonly-occurring) pixel values of the block into entries of the palette. Video encoder 20 may select the commonly-occurring pixel values such that the pixel values display a minimum variation, in terms of color information. In turn, the minimum variation between pixel values within the selected set of commonly-occurring pixel values may form the error limit of the corresponding palette. It will be appreciated that, while the palette error limit may include several pixel values, the palette may not necessarily include every pair of pixel values that differ by at least the palette error limit. Thus, the same palette error limit may apply to palettes of varying sizes. Video encoder 20 may use the palette error limit in making determinations as to the color values that are to be included in the palette.

Video encoder 20 may implement techniques of this disclosure to define the error limit for a palette. According to various aspects of this disclosure, video encoder 20 may determine the palette error limit based on the quantization parameter (QP) for the palette-coded block. In various examples, video encoder 20 may determine that the palette error limit is directly proportional to the QP value for the corresponding block. More specifically, in these examples, video encoder 20 may assign a larger error limit for a palette for a block that is quantized with a greater QP value, and a smaller error limit for a palette for a block that is quantized with a lesser QP value.

Thus, video encoder 20 may define palettes that require a greater variation between pixel values for blocks that are quantized with greater QP values, and may define palettes that require a lesser variation between pixel values for blocks that are quantized with greater QP values. Additionally, video encoder 20 may generate and/or store a table (e.g., a mapping table or look-up table) to reflect the relationship between each QP value and the corresponding palette error limit. In this manner, video encoder 20 may implement various techniques of this disclosure to improve computational efficiency by using a table to store the relationship between each QP value and the corresponding error limit. More specifically, by using a table to store the relationship between the QP values and the corresponding palette error limit, video encoder 20 may implement the techniques described herein to provide improved efficiency over the relatively computationally expensive techniques of solving a function for each palette to derive the corresponding palette error limit. Thus, video encoder 20 may customize the palette (in accordance with the palette's error limit) based on the QP value with which the corresponding block is quantized, thereby determining the contents of the palette for a block based on the block's QP value, in accordance with various aspects of this disclosure.

Video encoder 20 may, in some examples, implement various techniques of this disclosure for quantized escape pixel derivation. More specifically, video encoder 20 may implement the techniques to define the quantization value of the QP for an escape pixel. For example, according to palette-based coding techniques, if video encoder 20 detects an escape pixel in a palette-coded block, video encoder 20 may encode and signal the pixel value, or a prediction error thereof, because the corresponding palette does not include any entries for the escape pixel. Additionally, to conserve signaling bandwidth, video encoder 20 may quantize the encoded pixel value of the escape pixel prior to signaling.

According to existing palette-based coding techniques, no quantization value (QP value) was defined for quantizing an escape pixel. Video encoder 20 may implement techniques of this disclosure to define the QP value for quantizing an escape pixel. More specifically, video encoder 20 may define the QP value for an escape pixel as equal to the QP value for traditional coefficient encoding within the same color channel (e.g., luma (Y), chroma (U, Cr), or chroma (V, Cb)). In one example, video encoder 20 may define the QP value for an escape pixel as equal to the QP value for traditional coefficient encoding within the same color channel, and within the same quantization group. Thus, video encoder 20 may quantize all escape pixels according to a single QP value within a given channel. Additionally, as video encoder 20 may define the QP value for all escape pixels only within a single channel, video encoder 20 may use different QP values for quantizing escape pixels with respect to different channels.

Video decoder 30 may perform reciprocal operations to those described above, to dequantize escape pixels in accordance with various techniques of this disclosure. For instance, video decoder 30 may dequantize all escape pixels of a single channel using the same QP value, based on information received in the encoded video bitstream from video encoder 20. More specifically, in accordance with aspects of this disclosure, video decoder 30 may dequantize any escape pixels (or prediction errors/residual values thereof) communicated over a particular channel using a QP value that is determined based on the QP value for traditional transform coefficient dequantization for blocks communicated over the current channel. In some examples, video decoder 30 may implement the techniques of this disclosure to dequantize escape pixels communicated over different channels using different QP values, based on the QP value for traditional transform coefficient coding being different among the different channels.

In this manner, video encoder 20 and video decoder 30 may implement the techniques described herein to define and apply a single QP value (to quantize and/or dequantize) all escape pixels communicated over a particular channel. Thus, video encoder 20 and video decoder 30 may apply aspects of this disclosure to define a QP value for escape pixels detected through palette-based coding, where existing palette-based coding techniques did not explicitly define a QP value for escape pixels.

Additionally, video encoder 20 and/or video decoder 30 may implement other techniques of this disclosure to use a flag to indicate and/or detect the inclusion of an escape pixel in a palette-coded block. According to existing palette-based coding techniques, escape pixels may be signaled and detected using a "reserved" palette index value. For instance, according to the existing palette-based coding techniques, the reserved palette index value that indicates an escape pixel may be 32. More specifically, the palette index value of 32 may be used for all escape pixels, regardless of whether two escape pixels have different pixel values. Thus, according to the existing palette-based coding techniques, video coding devices may use a five-bit value (of 32) for each escape pixel of a palette-coded block.

Video encoder 20 may implement techniques of this disclosure to conserve computing resources (e.g., storage and memory) and reduce bandwidth consumption, while maintaining picture precision with respect to signaling an indication of an escape pixel in a palette-coded block. For instance, video encoder 20 may encode and signal a flag to indicate whether a pixel in a palette-coded block is an escape pixel. As described herein, the flag, when enabled, may indicate that the associated pixel is assigned a palette index referred to as "other index." Video encoder 20 may use the "other index" status of the flag to replace the palette index value of 32 that is traditionally used to indicate an escape pixel with respect to the palette. Thus, video encoder 20 may encode and signal a one-bit flag instead of a five-bit index value to indicate that a pixel of a palette-coded block is an escape pixel. In turn, when an escape pixel is indicated by the one-bit flag, video encoder 20 may encode and signal the pixel value (or residual data thereof) of the escape pixel in the encoded video bitstream.

Video decoder 30 may also implement techniques of this disclosure to use a one-bit flag to determine that a pixel of a palette-coded block is an escape pixel. In various examples, video decoder 30 may perform reciprocal operations with respect to the encoding and signaling operations described above with respect to video encoder 20, to use the one-bit flag to identify an escape pixel in a palette-coded block. For instance, video decoder 30 may receive an enabled one-bit flag associated with a pixel of a palette-coded block. Based on the one-bit flag being in the enabled state, video decoder 30 may determine that the color information for the associated pixel is not included in the palette for the current block. In other words, video decoder 30 may determine that, if the received one-bit flag is enabled, the associated pixel is an escape pixel. In this manner, video decoder 30 may implement the techniques of this disclosure to reconstruct a palette-coded block using a one-bit flag to identify an escape pixel in the palette-coded block. Thus, video decoder 30 may conserve computing resources (e.g., storage and/or memory) and bandwidth requirements with respect to identifying escape pixels in palette-coded blocks. Additionally, when an escape pixel is indicated by the one-bit flag, video decoder 30 may receive, in the encoded video bitstream, the color information (or residual data thereof) corresponding to any identified escape pixels, and may reconstruct the palette-coded block accordingly.

Video encoder 20 and video decoder 30 may also implement techniques of this disclosure to quantize and dequantize the pixel values of escape pixels in accordance with palette-based coding. For instance, video encoder 20 may conserve computing resources (e.g., memory usage, processor clock cycles, etc.) by quantizing the pixel values of escape pixels according to aspects of this disclosure. In some examples, video encoder 20 may implement the techniques described herein to quantize the escape pixel values by substituting divide operations with shift operations (e.g., right-shift operations). More specifically, video encoder 20 may determine the specific right-shift operation based on the QP value of the corresponding escape pixel.

For instance, video encoder 20 may form a table that maps the QP value of each escape pixel to the amount of the right-shift to apply to the pixel value. Video encoder 20 may form the table to include 52 entries. For example, the 52-entry mapping table may provide a right-shift amount corresponding to each possible QP value for a given escape pixel. Alternatively, video encoder 20 may apply a mapping operation to determine the right-shift amount for each pixel, based on the corresponding QP value entry in the table. The mapping function may be more computationally efficient and may conserve memory requirements, in comparison to the 52-entry mapping table used according to existing quantization techniques for escape pixels according to palette-based coding. By deriving the right-shift value (operand) by solving a function as described herein, video encoder 20 may eliminate the need for video decoder 30 to store a 52-entry table, thereby enabling video decoder 30 to dequantize escape pixels while reducing storage requirements for the dequantization process.

In various examples, video encoder 20 may quantize an escape pixel by determining the right-shift amount for an escape pixel based on the mapping operation described above, and applying a linear function to the escape pixel value, using the determined right-shift amount. An example of a linear function that video encoder 20 may apply to quantize an escape pixel is as follows:

$$\text{Right\_shift} = a*((QP+b)>>c)+d,$$

where a, b, c, and d are all integer parameters. Additionally, the ">>" operator denotes the right-shift operation. In a specific result of applying the equation above, video encoder 20 may determine that the right-shift amount for an escape pixel value is three. The resulting right-shift operation may be expressed as Right_shift=(QP>>3)

Video decoder 30 may implement techniques of this disclosure to perform reciprocal operations of those described above with respect to video encoder 20, to dequantize a quantized escape pixel value. For instance, video decoder 30 may implement techniques of this disclosure to calculate a shift amount (e.g., for a corresponding left-shift operation) based on a QP value in dequantizing the corresponding quantized escape pixel value. In this manner, video decoder 30 may also apply aspects of this disclosure to conserve computing resources by leveraging a mapping function instead of storing a 52-entry mapping table.

As described above, video encoder 20 and/or video decoder 30 may implement various techniques of this disclosure, whether individually or in any combination and/or sequence, to provide improved coding efficiency with respect to palette-based coding, while maintaining picture quality and data precision. Thus, the techniques described herein may provide various potential advantages over existing techniques of palette-based video coding. In specific examples, as described above, the techniques of this disclosure may enable video coding devices to more efficiently encode and/or decode video data and reduce bandwidth consumption, while maintaining accuracy of the video data.

In some examples, the techniques for palette-based coding of video data described herein may be used with one or more other coding techniques, such as techniques for inter- or intra-predictive coding. For example, as described in greater detail below, an encoder or decoder, or combined encoder-decoder (codec), may be configured to perform inter- and intra-predictive coding, as well as palette-based coding.

In various examples, this disclosure describes different aspects of major color index coding techniques. It may be possible to combine part or all of the described methods.

An example of coding of index prediction direction is now described. As stated above, for each index, there are three possible prediction directions: 'copy_from_top', 'copy_from_left', and 'no_copy'. Three code words should be assigned to the three directions. For example, the code words can be '0', '01', and '10'. In the case when the collocated pixel in the above line and the left neighboring pixel are the same, only two code words may be necessary. For example, in this case, '0' can represent 'no copy' and '1' can represent copy_from_top or left.

As described above, in some cases, coding of the color index map for a video block may be bypassed. If the number of major colors equals to one and there is no 'escape pixel,' then the coding of index block can be bypassed. This principle can either be applied to each individual color component, or can be applied to the combine index which contain more than one color component.

In another example, a flag (or other type of syntax element) can be signaled in the coded bitstream to indicate whether this feature of bypassing index coding is used or not. For instance, a video encoder may signal, in a bitstream that comprises a coded representation of video data, a syntax element (e.g., the flag) to indicate whether or not bypassing index coding is used. Accordingly, a video decoder may obtain, from a bitstream, a syntax element that indicates whether or not bypassing index coding is used. The flag can be signaled in a SPS, PPS, slice header, or other structure, or per CTU or per CU or in any other block sizes.

Thus, in some examples, the video encoder may signal, in the bitstream, a syntax element indicating whether the index block is signaled in the bitstream. In some examples, the video encoder may signal the syntax element in a SPS, a PPS, or a slice header in the bitstream. Moreover, in some examples, the video encoder may signal the syntax element on a per CTU basis or a per CU basis. In some such examples, the video decoder may obtain, from the bitstream, a syntax element indicating whether the index block is signaled in the bitstream. The flag can be signaled in a SPS, PPS, a slice header, or another syntax structure, or per CTU or per CU or in any other block sizes. Thus, in some examples, the video decoder may obtain the syntax element from a SPS, a PPS, or a slice header in the bitstream. Furthermore, in some examples, the video decoder may obtain the syntax element on a per CTU basis or a per CU basis.

An example of bit plane coding of indexes is now described. In normal line mode, if an index cannot be predicted from top or left; or in horizontal mode, the line is copied from the leftmost index from the current line, the index value has to be coded directly. In this case, an index value can be coded bin by bin according to a binary representation of the index value. For example, assuming an index located in line i, column j is denoted by:

$$C_{i,j} = b_{0ij} + 2b_{1ij} + \ldots + 2^N b_{Nij} = [b_{0ij} b_{1ij} \ldots b_{Nij}]_2$$

where $b_{kij}$=0 or 1. Then $b_{kij}$ can be coded using coded neighboring index values of $b_{kij}$ as the CABAC contexts. For example, $b_{kij}$ can use $b_{k(i-1)j} + b_{ki(j-1)}$ as context. $b_{kij}$ may also be coded using single context, or without any context, i.e. bypass coding.

To enable higher throughput, some of the bins of the index are coded in bypass and others using CABAC contexts. For instance, only the Most Significant Bin of the representation uses context, while the others are coded in bypass mode.

An example of a flag to indicate 'other index' is now described. In this example, a one bit flag can be used to indicate whether an index is 'other index' or not. This flag can be coded using CABAC with surrounding coded neighbor indexes of the flag as context.

An example of quantization of escape value using a function for right shift is now described. The table to map from each QP to the amount of right-shift requires 52 entries. A mapping function may save this memory requirements and provide an efficient way to compute the right-shift. For instance, a linear function might be applied:

Right_shift=$a*((QP+b)>>c)+d$ where a, b, c, and d are integer parameters. A specific example of this function is the following:

Right_shift=$(QP>>3)$

An example of binarization and coding of indexes is now described. In this example, first, a flag is coded using the neighbor coded indexes as context to indicate whether the index is zero or not. If the index is not zero, assume that the index is C>0. Then C−1 is binarized and coded using bypass CABAC coding. Examples of binarization methods include but are not restricted to: unary, truncated unary, exponential Golomb, or Golomb-Rice with fixed or adaptive parameters.

An example technique for bypass of the indication flag of escape pixels is now described. In one example, a flag can be used to indicate whether a pixel is an 'escape pixel' (i.e. not presented in a major color table) or not. This flag can be bypassed if the number of major colors is less than a maximum number of major colors, which implicitly indicates that no 'escape pixel' exists. This maximum number of major colors can be predefined or adaptively adjusted. When the flag is bypassed, data indicating the flag is not included in a bitstream.

For instance, in some examples, a video encoder may omit, from a bitstream, data indicating the flags if the number of major colors for a block is less than a maximum allowed number of major colors. Hence, if the number of distinct sample values for pixels in the block is less than the maximum allowed number of major colors, there can be an entry in the major color table for each of the distinct sample values of the pixels of the block and none of the pixels of the block is an escape pixel. Conversely, if the number of distinct sample values for pixel in the block is greater than the maximum allowed number of major colors, one or more of the pixels of the block is an escaped pixel. Hence, if the number of distinct sample values for pixel in the block is greater than the maximum allowed number of major colors, the video encoder may signal flags to indicate which of the pixels of the block are escape pixels.

In one example, a video decoder may obtain, from a bitstream that comprises an encoded representation of the video data, a syntax element that indicates whether a pixel in a block is an escape pixel when the number of distinct sample values of pixels in the block is greater than a maximum allowed number of colors in a major color table. In this example, the video decoder does not obtain the syntax element from the bitstream when the number of distinct sample values of pixels in the block is less than the maximum allowed number of colors in the major color table. When the pixel is not an escaped pixel, the video decoder may determine, based on an index for the pixel, an entry in the major color table that specifies a sample value for the pixel.

In a similar example, if the number of distinct sample values of pixels in a block is greater than a maximum allowed number of colors in a major color table, a video encoder may include, in a bitstream that comprises an encoded representation of the video data, data indicating a syntax element indicating whether a pixel of the block is an escaped pixel. If the number of distinct sample values of pixels in a block is less than a maximum allowed number of colors in a major color table, the video encoder may omit the syntax element from the bitstream. When the pixel is not an escaped pixel, the video encoder may include, in the bitstream, data indicating an index that specifies an entry in the major color table that specifies a sample value for the pixel.

In another example, a flag (or other type of syntax element) can be signaled in the coded bitstream to indicate whether this feature of bypassing the indication flag of escape pixels is used or not. For instance, a video encoder may signal, in the coded bitstream, a syntax element to indicate whether or not bypassing an indication syntax element (e.g., the indication flag) of escape pixels is used. Accordingly, a video decoder may obtain, from a bitstream, the syntax element that indicates whether or not bypassing the indication syntax element of escape pixels is used. The flag can be signaled in a SPS, PPS, a slice header, or another structure, or per CTU or per CU or in any other block sizes.

Thus, in some examples, a video encoder may signal, in a bitstream, a second syntax element indicating whether the bitstream includes a first syntax element (i.e., a syntax element indicating whether a pixel is an escape pixel). Furthermore, in some examples, the video decoder may obtain, from the bitstream, a second syntax element indicating whether the bitstream includes a first syntax element (i.e., a syntax element indicating whether a pixel is an escape pixel). In some examples, this second syntax element may be signaled in a sequence parameter set, a picture parameter set, or a slice header. In some examples, the second syntax element is signaled on a per CTU basis or a per CU basis.

Example entropy coding methods of quantized escape pixel values or quantized escape prediction errors is now described. In some examples, the quantized escape pixel values (prediction errors) are binarized using fixed length codeword. For the first bin of the codeword, CABAC coding is applied with a context modeling. For the remaining bins of the codeword, CABAC bypass coding is applied with equal probabilities. In this example, the length of the codeword is dependent on QP values for each luminance-chrominance channel (YUV or RGB). For instance, given an input 8-bit depth data, after quantization of step size 4, the quantized value is in the range of [0, 63], and thus a 6-bit fixed length codeword may be used instead of an 8-bit codeword, in order to reduce the bits to be transmitted.

For instance, a video decoder may determine whether a pixel of a picture of the video data is an escaped pixel. Responsive to determining that the pixel is not an escaped pixel, the video decoder may determine an index for the pixel and determine, based on the index for the pixel, a palette entry that specifies a sample value for the pixel. The palette entry may be in a palette that comprises palette entries specifying sample values. Responsive to determining that the pixel is an escaped pixel, the video decoder may use CABAC with context modeling to entropy decode the first bin of a fixed-length codeword. Furthermore, responsive to determining that the pixel is an escaped pixel, the video decoder may use CABAC bypass coding to entropy decode each bin of the fixed-length codeword that follows the first bin of the fixed-length codeword. Furthermore, responsive to determining that the pixel is an escaped pixel, the video decoder may de-binarize the fixed-length codeword to determine the sample value for the pixel. In some examples, the length of the fixed-length codeword is dependent on quantization parameter (QP) values for each channel (e.g., luminance, chrominance, etc. channel) of the picture.

In a similar example, a video encoder may determine whether a pixel of a picture of the video data is an escaped pixel. The pixel may be an escaped pixel when a sample value of the pixel corresponds to a sample value specified by a palette entry in a palette that comprises palette entries specifying sample values. Responsive to determining that the pixel is not an escaped pixel, the video encoder may determine an index for the pixel and include, in a bitstream that comprises an encoded representation of the video data, data that indicate the index for the pixel. Responsive to determining that the pixel is an escaped pixel, the video encoder may binarize the sample value of the pixel to generate a fixed-length codeword. Furthermore, responsive to determining that the pixel is an escaped pixel, the video encoder may use CABAC with context modeling to entropy encode the first bin of the fixed-length codeword. In addition, responsive to determining that the pixel in an escaped pixel, the video encoder may use CABAC bypass coding to entropy encode each bin of the fixed-length codeword that follows the first bin of the fixed-length codeword. In some examples, the length of the fixed-length codeword is dependent on QP values for each channel (e.g., luminance, chrominance, etc. channel) of the picture.

An example technique of palette error limit derivation is now described. In some examples, the palette size is related with QP. For instance, a larger palette error limit may be assigned for larger QP, thus smaller groups of palette indices; smaller palette error limit may be assigned for smaller QP, thus more groups of palette indices. A mapping table (look-up table) of 52 entries may be used in the memory to store the relationship between each QP value and palette error limit.

For instance, in some examples, a video decoder may determine an index for a pixel of a picture of the video data. Furthermore, the video decoder may determine, based on the index for the pixel, an entry in a palette, wherein the determined entry specifies a sample value for the pixel, wherein a size of the palette is related to a QP. Similarly, in some examples, a video encoder may include, in a bitstream that comprises an encoded representation of the video data, data indicating an index of an entry in a palette, wherein a size of the palette is related to a quantization parameter. In some such examples, the video encoder may determine, based on the quantization parameter, a palette error limit. In such examples, the video encoder may include, in the bitstream, the data indicating the index of the entry in the palette only if a difference between a sample value specified by the entry and a sample value of the pixel is less than the palette error limit.

An example technique of quantized escape pixel derivation is now described. In some examples, the quantization parameter for an escape pixel (or prediction error) of each channel is the same as the quantization parameter for traditional coefficients coding. In other words, the escape pixel (prediction error) quantization or dequantization may be different in different channels. At a video encoder, each channel of the escape pixel uses the quantization parameter for traditional coefficient coding. At a video decoder, each channel of the escape pixel uses the received quantization parameter for traditional coefficient coding to reconstruct the escape pixel value or escape pixel prediction error.

In some examples, a video decoder may determine whether a pixel of a picture of the video data is an escaped pixel. Responsive to determining that the pixel is not an escaped pixel, the video decoder may determine, based on an index for the pixel, an entry in a palette that comprises entries specifying sample values, the determined entry specifying a sample value of the pixel. Responsive to determining that the pixel is an escaped pixel, the video decoder may determining, based on one or more syntax elements in the bitstream and without determining an entry in the pallet, the sample value of the pixel. Furthermore, responsive to determining that the pixel is an escaped pixel, the video decoder may de-quantize the sample value of the pixel. The sample value of the pixel may be a residual sample value of the pixel, and the video decoder may add a predictive sample value for the pixel to the residual sample value of the pixel to determine a decoded sample value for the pixel. Furthermore, in some such examples, the sample value of the pixel is a first sample value of the pixel, the quantization parameter is a first quantization parameter, the first sample value of the pixel and the first quantization parameter correspond to a first channel. In such examples, responsive to determining that the pixel is an escaped pixel, the video decode may de-quantize, based on a second quantization parameter, a second sample value of the pixel, the second sample value of the pixel and the second quantization parameter corresponding to the second channel.

In a similar example, a video encoder may determine whether a pixel of a picture of the video data is an escaped pixel. The pixel may be an escaped pixel when a sample value of the pixel does not correspond to an entry in a palette that comprises entries specifying sample values. Responsive to determining that the pixel is an escaped pixel, the video encoder may quantize, based on a quantization parameter, the sample value of the pixel and include, in a bitstream that comprises an encoded representation of the video data, data indicating the quantized sample value of the pixel. Responsive to determining that the pixel is not an escaped pixel, the video encoder may determine an entry in the palette that corresponds to the sample value of the pixel and include, in the bitstream, data indicating an index to the determined entry in the palette. In some examples, the sample value for the pixel is a residual sample value of the pixel. Furthermore, in some examples, the sample value of the pixel is a first sample value of the pixel, the quantization parameter is a first quantization parameter, the first sample value of the pixel and the first quantization parameter correspond to a first channel, and responsive to determining that the pixel is an escaped pixel, the video encoder may quantize, based on a second quantization parameter, a second sample value of the pixel, the second sample value of the pixel and the second quantization parameter corresponding to the second channel. The video encoder may include, in the bitstream, data indicating the quantized second sample value of the pixel.

Figure 2:
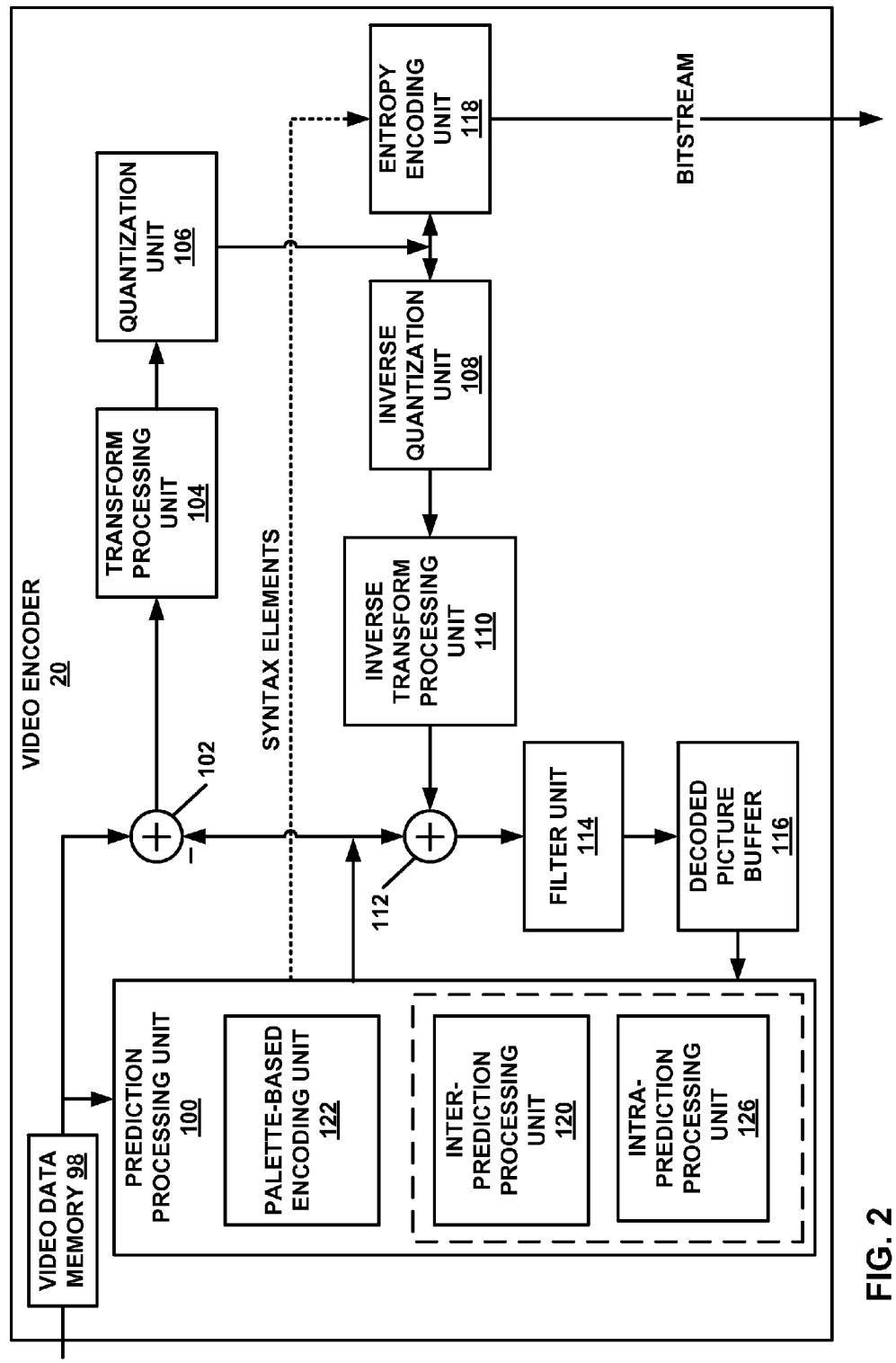
FIG. 2 is a block diagram illustrating an example video encoder that may implement the techniques described in this disclosure.

FIG. 2 is a block diagram illustrating an example video encoder 20 that may implement various techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 2, video encoder 20 includes a video data memory 98, a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit and a motion compensation unit (not shown). Video encoder 20 also includes a palette-based encoding unit 122 configured to perform various aspects of the palette-based coding techniques described in this disclosure. In other examples, video encoder 20 may include more, fewer, or different functional components.

Video data memory 98 may store video data to be encoded by the components of video encoder 20. The video data stored in video data memory 98 may be obtained, for example, from video source 18. Decoded picture buffer 116 may be a reference picture memory that stores reference video data for use in encoding video data by video encoder 20, e.g., in intra- or inter-coding modes. Video data memory 98 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 98 and decoded picture buffer 116 may be provided by the same memory device or separate memory devices. In various examples, video data memory 98 may be on-chip with other components of video encoder 20, or off-chip relative to those components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include one or more predictive sample blocks of the PU and motion information for the PU. Inter-prediction unit 121 may perform different operations for a PU of a CU depending on whether the PU is in an I slice, a P slice, or a B slice. In an I slice, all PUs are intra predicted. Hence, if the PU is in an I slice, inter-prediction unit 121 does not perform inter prediction on the PU. Thus, for blocks encoded in I-mode, the predictive block is formed using spatial prediction from previously-encoded neighboring blocks within the same frame.

If a PU is in a P slice, the motion estimation unit of inter-prediction processing unit 120 may search the reference pictures in a list of reference pictures (e.g., "RefPicList0") for a reference region for the PU. The reference region for the PU may be a region, within a reference picture, that contains sample blocks that most closely correspond to the sample blocks of the PU. The motion estimation unit may generate a reference index that indicates a position in RefPicList0 of the reference picture containing the reference region for the PU. In addition, the motion estimation unit may generate an MV that indicates a spatial displacement between a coding block of the PU and a reference location associated with the reference region. For instance, the MV may be a two-dimensional vector that provides an offset from the coordinates in the current decoded picture to coordinates in a reference picture. The motion estimation unit may output the reference index and the MV as the motion information of the PU. The motion compensation unit of inter-prediction processing unit 120 may generate the predictive sample blocks of the PU based on actual or interpolated samples at the reference location indicated by the motion vector of the PU.

If a PU is in a B slice, the motion estimation unit may perform uni-prediction or bi-prediction for the PU. To perform uni-prediction for the PU, the motion estimation unit may search the reference pictures of RefPicList0 or a second reference picture list ("RefPicList1") for a reference region for the PU. The motion estimation unit may output, as the motion information of the PU, a reference index that indicates a position in RefPicList0 or RefPicList1 of the reference picture that contains the reference region, an MV that indicates a spatial displacement between a sample block of the PU and a reference location associated with the reference region, and one or more prediction direction indicators that indicate whether the reference picture is in RefPicList0 or RefPicList1. The motion compensation unit of inter-prediction processing unit 120 may generate the predictive sample blocks of the PU based at least in part on actual or interpolated samples at the reference region indicated by the motion vector of the PU.

To perform bi-directional inter prediction for a PU, the motion estimation unit may search the reference pictures in RefPicList0 for a reference region for the PU and may also search the reference pictures in RefPicList1 for another reference region for the PU. The motion estimation unit may generate reference picture indexes that indicate positions in RefPicList0 and RefPicList1 of the reference pictures that contain the reference regions. In addition, the motion estimation unit may generate MVs that indicate spatial displacements between the reference location associated with the reference regions and a sample block of the PU. The motion information of the PU may include the reference indexes and the MVs of the PU. The motion compensation unit may generate the predictive sample blocks of the PU based at least in part on actual or interpolated samples at the reference region indicated by the motion vector of the PU.

In accordance with various examples of this disclosure, video encoder 20 may be configured to perform palette-based coding. With respect to the HEVC framework, as an example, the palette-based coding techniques may be configured to be used as a CU mode. In other examples, the palette-based coding techniques may be configured to be used as a PU mode in the framework of HEVC. Accordingly, all of the disclosed processes described herein (throughout this disclosure) in the context of a CU mode may, additionally or alternatively, apply to a PU mode. However, these HEVC-based examples should not be considered a restriction or limitation of the palette-based coding techniques described herein, as such techniques may be applied to work independently or as part of other existing or yet to be developed systems/standards. In these cases, the unit for palette coding can be square blocks, rectangular blocks or even regions of non-rectangular shape.

Palette-based encoding unit 122, for example, may perform palette-based encoding when a palette-based encoding mode is selected, e.g., for a CU or PU. For example, palette-based encoding unit 122 may be configured to generate a palette having entries indicating pixel values, select pixel values in a palette to represent pixel values of at least some positions of a block of video data, and signal information associating at least some of the positions of the block of video data with entries in the palette corresponding, respectively, to the selected pixel values. Although various functions are described as being performed by palette-based encoding unit 122, some or all of such functions may be performed by other processing units, or a combination of different processing units.

Palette-based encoding unit 122 may be configured to generate any of the various syntax elements described herein. Accordingly, video encoder 20 may be configured to encode blocks of video data using palette-based code modes as described in this disclosure. Video encoder 20 may selectively encode a block of video data using a palette coding mode, or encode a block of video data using a different mode, e.g., such an HEVC inter-predictive or intra-predictive coding mode. The block of video data may be, for example, a CU or PU generated according to an HEVC coding process. Video encoder 20 may encode some blocks with inter-predictive temporal prediction or intra-predictive spatial coding modes and encode other blocks with the palette-based coding mode.

Intra-prediction processing unit 126 may generate predictive data for a PU by performing intra prediction on the PU. The predictive data for the PU may include predictive sample blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. When using some intra prediction modes to generate a set of predictive data for the PU, intra-prediction processing unit 126 may extend values of samples from sample blocks of neighboring PUs across the predictive blocks of the PU in directions associated with the intra prediction modes. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive sample blocks of the selected predictive data may be referred to herein as the selected predictive sample blocks.

Residual generation unit 102 may generate, based on the coding blocks (e.g., luma, Cb and Cr coding blocks) of a CU and the selected predictive sample blocks (e.g., predictive luma, Cb and Cr blocks) of the PUs of the CU, residual blocks (e.g., luma, Cb and Cr residual blocks) of the CU. For instance, residual generation unit 102 may generate the residual blocks of the CU such that each sample in the residual blocks has a value equal to a difference between a sample in a coding block of the CU and a corresponding sample in a corresponding selected predictive sample block of a PU of the CU.

Transform processing unit 104 may perform quad-tree partitioning to partition the residual blocks associated with a CU into transform blocks associated with TUs of the CU. Thus, in some examples, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive sample blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

In some examples, residual coding is not performed with palette coding. Accordingly, video encoder 20 may not perform transformation or quantization when coding using a palette coding mode. In addition, video encoder 20 may entropy encode data generated using a palette coding mode separately from residual data.

According to one or more of the techniques of this disclosure, video encoder 20, and specifically palette-based encoding unit 122, may perform palette-based video coding of predicted video blocks. As described above, a palette generated by video encoder 20 may be explicitly encoded and sent to video decoder 30, predicted from previous palette entries, predicted from previous pixel values, or a combination thereof.

Palette-based encoding unit 122 may apply techniques of this disclosure to bypass encoding of a map of palette index values for pixels of a palette-coded block under certain circumstances. According to aspects of this disclosure, palette-based encoding unit 122 may bypass encoding of the map of palette index values for a palette-coded block if palette-based encoding unit 122 determines that all pixels of the block are of the same color. For instance, palette-based encoding unit 122 may determine that a palette-coded CU of a picture is a "single color CU" and may bypass encoding and signaling of the map of palette index values for the single color CU.

More specifically, palette-based encoding unit 122 may determine whether a palette-coded CU is a single color CU if the current CU satisfies two conditions. The first condition that palette-based encoding unit 122 may use in determining whether the palette-coded CU is a single color CU is whether the size of the corresponding palette is equal to one (1). If the size of the palette is equal to one, then palette-based encoding unit 122 may determine that the first condition is met with respect to the palette-coded CU being a single color CU. More specifically, if the palette size is one, then palette-based encoding unit 122 may determine that the palette includes only one color that corresponds to (non-escape) pixels of the palette-coded CU. In some examples where the palette size is one, palette-based encoding unit 122 may determine that the only index value included in the palette is zero (0).

If palette-based encoding unit 122 determines that the palette size for the palette-coded CU is 1 (i.e., that the first condition is met), then palette-based encoding unit 122 may determine whether the palette-coded CU meets a second condition to be a single color CU. The second condition that palette-based encoding unit 122 may use in determining whether the palette-coded CU is a single color CU is that the palette-coded CU does not include any escape pixels. If the palette-coded CU includes at least one escape pixel, then video encoder 20 may determine that, even though the corresponding palette indicates only one color with respect to the palette-coded CU, the palette-coded CU includes pixels of two or more colors. For instance, the palette-coded CU may include at least one pixel that has the color indicated in the palette, and at least one escape pixel that has a different color.

If palette-based encoding unit 122 determines that the palette-coded CU satisfies both of the conditions described above, then palette-based encoding unit 122 may determine that the palette-coded CU is a single color CU. More specifically, if the palette-coded CU is associated with a single-entry palette (shown by the palette size of one), and the palette-coded CU does not include any escape pixels, then palette-based encoding unit 122 may determine that all individual pixels of the palette-coded CU are of the same color (i.e., the color indicated by the single entry of the corresponding palette). In various implementations, palette-based encoding unit 122 may apply the single color CU identification techniques described above with respect to a single color component basis with respect to the palette, or to a combined index that indicates more than one color component.

Responsive to determining that the palette-coded CU includes pixels of only one color (i.e., that the CU is a single color CU), palette-based encoding unit 122 may implement techniques of this disclosure to bypass encoding the map of palette index values for the pixels of the single color CU. By bypassing the encoding of the map of palette index values for the CU, palette-based encoding unit 122 may conserve computing resources and bandwidth that would otherwise be expended for encoding and signaling color information for the CU. Instead of encoding a map of palette index values for the pixels of the single color CU, palette-based encoding unit 122 may implement techniques of this disclosure to more efficiently indicate the color information for the entire set of pixels that make up the single color CU. In cases where palette-based encoding unit 122 bypasses encoding of the palette index for all individual pixels of a detected single color CU, video encoder 20 (or one or more components thereof) may not need to signal a map of palette index values for the pixels of the CU, thereby conserving computing resources and reducing bandwidth consumption.

According to some examples of this disclosure, palette-based encoding unit 122 may encode a flag to indicate that video encoder 20 bypassed encoding (and signaling) of the map of palette index values on a line-by-line basis for the single color CU. By encoding a one-bit flag for the entire CU instead of the map (of any size) of palette index values for the pixels of the CU, palette-based encoding unit 122 may cause video encoder 20 to conserve computing resources and signaling bandwidth in comparison to existing palette-based coding techniques. Moreover, palette-based encoding unit 122 may maintain precision and quality of the encoded single color CU, because the single-entry palette encoded by palette-based encoding unit 122 and signaled by video encoder 20 for the CU includes the color information for all pixels of the CU. In various examples, palette-based encoding unit 122 may encode the flag in various ways, such as in an SPS, a PPS, or a slice header. In various examples, palette-based encoding unit 122 may encode the flag on a per-CTU basis, a per-CU basis, or for a block of any block size, as well.

In other examples, palette-based encoding unit 122 may implement techniques of this disclosure to derive an error limit for a palette for a palette-coded block. As used herein, the terms "error limit" or "palette error limit" may refer to the minimum variation of pixel values (e.g., in terms of color information) that the entries of the palette can include. More specifically, the palette error limit defines a minimum variation in color value that any two palette entries must display. As described, to encode a block according to palette-based coding, palette-based encoding unit 122 may construct the corresponding palette to include color values that occur most frequently (on a pixel-by-pixel basis) within the block.

In other words, palette-based encoding unit 122 may construct a palette by clustering high-occurrence (or relatively higher-occurrence) pixel values of the block in the palette. Palette-based encoding unit 122 may select the high-occurrence pixel values such that the pixel values display at least a particular minimum variation, in terms of color information. In turn, the minimum variation of pixel value within the selected set of high-occurrence pixel values may form the error limit of the corresponding palette. It will be appreciated that, while the palette error limit may include several pixel values, the palette may not necessarily include every pair of pixel values that display at least the palette error limit. Thus, the same palette error limit may apply to palettes of varying sizes. Palette-based encoding unit 122 may use the palette error limit in making determinations as to the color values that are to be included in the palette.

Palette-based encoding unit 122 may implement techniques of this disclosure to define the error limit for a palette. According to various aspects of this disclosure, palette-based encoding unit 122 may determine the palette error limit based on the quantization parameter (QP) for the palette-coded block. In various examples, palette-based encoding unit 122 may determine that the palette error limit is directly proportional to the QP value for the corresponding block. More specifically, in these examples, palette-based encoding unit may assign a larger error limit for a palette for a block that is quantized with a greater QP value, and a smaller error limit for a palette for a block that is quantized with a lesser QP value.

Additionally, palette-based encoding unit 122 may implement the techniques described herein to derive the palette error limit by storing a table that maps the QP value of a palette-coded block to the corresponding palette error limit. In turn, palette-based encoding unit 122 may access a particular palette error limit entry from the table in order to determine the corresponding palette. By using a table that maps the palette error limit to the QP of a palette-coded block, palette-based encoding unit 122 may improve computational efficiency in comparison to existing palette-based coding techniques. More specifically, by implementing the mapping table-based palette error limit derivation techniques described herein, palette-based encoding unit 122 may conserve resources that would otherwise be expended according to existing techniques, which rely on executing a function to derive the error limit for each palette.

Thus, palette-based encoding unit 122 may define palettes that can accommodate a greater number of palette indices for require a greater variation between pixel values for blocks that are quantized with greater QP values, and may define palettes that require a lesser variation between pixel values that are quantized with greater QP values. In this manner, palette-based encoding unit 122 may implement various techniques of this disclosure to customize the palette (based on the palette's error limit) based on the QP value with which the corresponding block is quantized, thereby determining the contents of the palette for a block based on the block's QP value. Additionally, palette-based encoding unit 122 may generate and/or store a table (e.g., a mapping table or look-up table) to reflect the relationship between each QP value and the corresponding palette error limit. In this manner, palette-based encoding unit 122 may implement the techniques of this disclosure to derive a palette error limit for a corresponding palette in a less computationally expensive way than in existing palette-coding techniques, which rely on solving a function to derive the error limit for each palette.

Palette-based encoding unit 122 may, in some examples, implement various techniques of this disclosure for quantized escape pixel derivation. More specifically, palette-based encoding unit 122 may implement the techniques to define the quantization value of the QP for an escape pixel. For example, according to palette-based coding techniques, if palette-based encoding unit 122 detects an escape pixel in a palette-coded block, palette-based encoding unit 122 may encode the pixel value, or a prediction error thereof, because the corresponding palette does not include any entries for the escape pixel. Additionally, to conserve signaling bandwidth, quantization unit 106 may quantize the encoded pixel value of the escape pixel prior to signaling by other components of video encoder 20.

According to existing palette-based coding techniques, no quantization value (QP value) was defined for quantizing an escape pixel. Palette-based encoding unit 122 may implement techniques of this disclosure to define the QP value for quantizing an escape pixel. More specifically, palette-based encoding unit 122 may define the QP value for an escape pixel as equal to the QP value for traditional coefficient encoding within the same color channel. Thus, palette-based encoding unit 122 may quantize all escape pixels according to a single QP value, within a given color channel. Additionally, as palette-based encoding unit 122 may define the QP value for all escape pixels only within a single color channel, palette-based encoding unit 122 may use different QP values for quantizing escape pixels with respect to different color channels.

Additionally, palette-based encoding unit 122 may implement other techniques of this disclosure to use a flag to indicate and/or detect the inclusion of an escape pixel in a palette-coded block. According to existing palette-based coding techniques, escape pixels may be signaled and detected using a "reserved" palette index value. For instance, according to the existing palette-based coding techniques, the reserved palette index value that indicates an escape pixel may be 32. More specifically, the palette index value of 32 may be used for all escape pixels, regardless of whether two escape pixels have different pixel values. Thus, according to the existing palette-based coding techniques, video coding devices may use a five-bit value (of 32) for each escape pixel of a palette-coded block.

Palette-based encoding unit 122 may implement techniques of this disclosure to conserve computing resources (e.g., storage and memory) and reduce bandwidth consumption, while maintaining picture precision with respect to signaling an indication of an escape pixel in a palette-coded block. For instance, palette-based encoding unit 122 may encode a flag (e.g., a one-bit data unit) to indicate whether a pixel in a palette-coded block is an escape pixel. As described herein, the flag, when enabled, may indicate that the associated pixel is assigned a palette index referred to as "other index." Palette-based encoding unit 122 may use the "other index" status of the flag to replace the palette index value of 32 that is traditionally used to indicate an escape pixel with respect to the palette. Thus, palette-based encoding unit 122 may encode (and other components of video encoder 20 may signal) a one-bit flag instead of a five-bit index value to indicate that a pixel of a palette-coded block is an escape pixel. In turn, video encoder 20 (or one or more components thereof) may encode and signal the pixel value, or residual data thereof, in the encoded video bitstream.

One or both of palette-based encoding unit 122 and quantization unit 106 may also implement techniques of this disclosure to quantize the pixel values of escape pixels in accordance with palette-based coding. For instance, palette-based encoding unit 122 and/or quantization unit 106 may conserve computing resources (e.g., memory usage, processor clock cycles, etc.) by quantizing the pixel values of escape pixels according to aspects of this disclosure. In some examples, quantization unit 106 may implement the techniques described herein to quantize the escape pixel values by substituting divide operations with shift operations (e.g., right-shift operations). More specifically, quantization unit 106 may determine the specific right-shift operation based on the QP value of the corresponding escape pixel. For instance, quantization unit 106 may derive the right-shift value by solving a function that includes the QP value as a parameter or operand.

For instance, according to existing techniques, palette-based encoding unit 122 may form a table that maps the QP value of each escape pixel to the amount of the right-shift to apply to the pixel value. Palette-based encoding unit 122 may form the table to include 52 entries. For example, the 52-entry mapping table may provide a right-shift amount corresponding to each possible QP value for a given escape pixel. In turn, quantization unit 106 may apply a mapping operation to determine the right-shift amount for each pixel, based on the corresponding QP value entry in the table.

In various examples, quantization unit 106 may implement various techniques of this disclosure to quantize an escape pixel by determining the right-shift amount for an escape pixel based on applying a linear function to the escape pixel value to determine the right-shift amount. An example of a linear function that quantization unit 106 may apply to derive the right-shift amount for quantizing an escape pixel is as follows:

$$\text{Right\_shift}=a*((QP+b)>>c)+d,$$

where a, b, c, and d are all integer parameters. Additionally, the ">>" operator denotes a right-shift operation. In a specific result of applying the equation above, quantization unit 106 may determine that the right-shift amount for an escape pixel value is three. The resulting right-shift operation may be expressed as Right_shift=(QP>>3). By solving a function (e.g., the linear function described above), quantization unit 106 may enable a decoding device (e.g., video decoder 30 and/or various components thereof) to dequantize an escape pixel, while conserving storage resources that would otherwise be expended to store the 52-entry table. In this manner, quantization unit 106 may implement techniques of this disclosure to quantize an escape pixel while mitigating storage requirements with respect to video decoder 30.

The techniques described in this disclosure may also include techniques for various combinations of one or more of signaling palette-based coding modes, transmitting palettes, predicting palettes, deriving palettes, or transmitting palette-based coding maps and other syntax elements.

Figure 3:
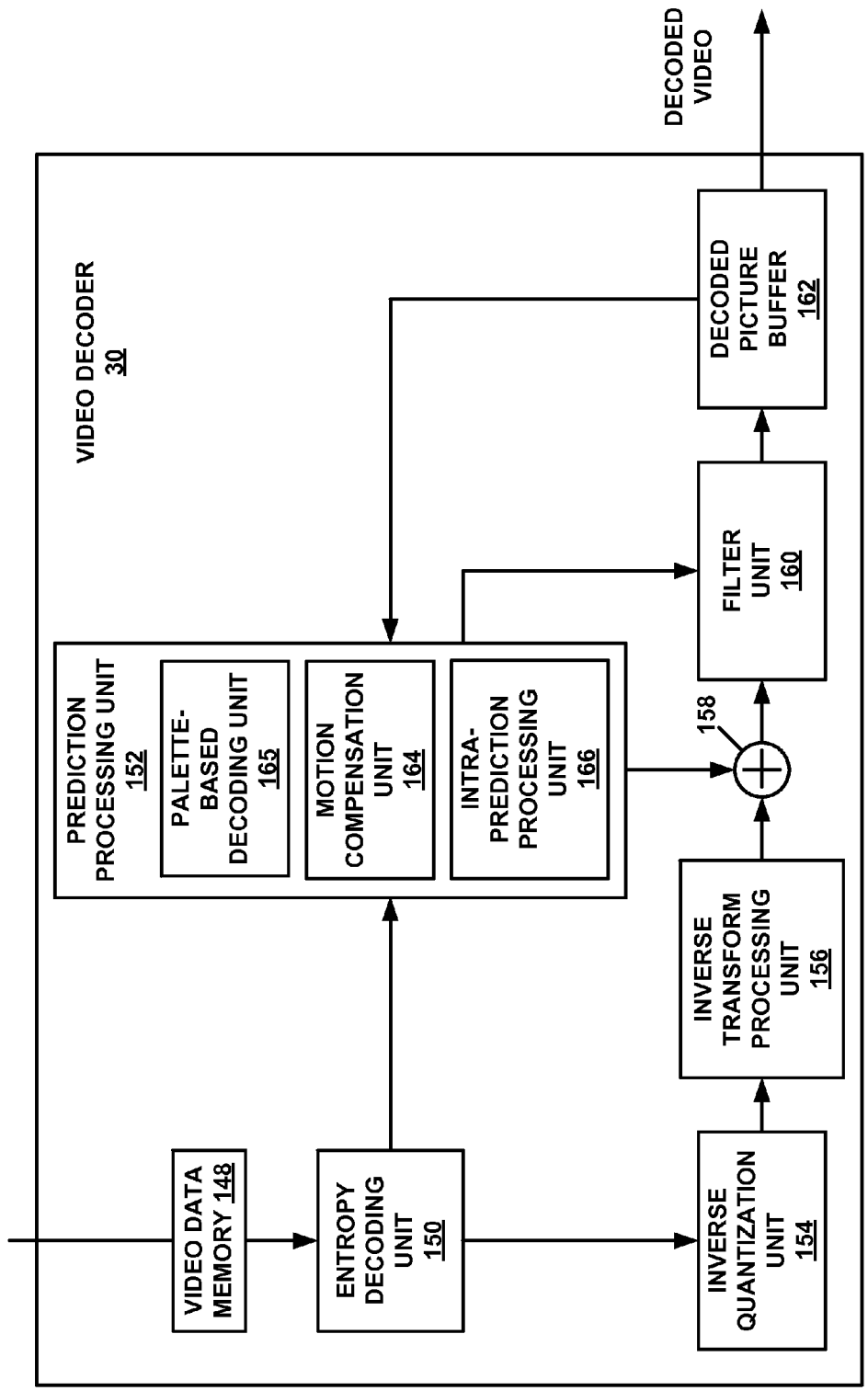
FIG. 3 is a block diagram illustrating an example video decoder that may implement the techniques described in this disclosure.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 3, video decoder 30 includes a video data memory 148, an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. Video decoder 30 also includes a palette-based decoding unit 165 configured to perform various aspects of the palette-based coding techniques described in this disclosure. In other examples, video decoder 30 may include more, fewer, or different functional components.

Video data memory 148 may store video data, such as an encoded video bitstream, to be decoded by the components of video decoder 30. The video data stored in video data memory 148 may be obtained, for example, from computer-readable medium 16, e.g., from a local video source, such as a camera, via wired or wireless network communication of video data, or by accessing physical data storage media. Video data memory 148 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes. Video data memory 148 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 148 and decoded picture buffer 162 may be provided by the same memory device or separate memory devices. In various examples, video data memory 148 may be on-chip with other components of video decoder 30, or off-chip relative to those components.

Video data memory 148, i.e., a CPB, may receive and store encoded video data (e.g., NAL units) of a bitstream. Entropy decoding unit 150 may receive encoded video data (e.g., NAL units) from video data memory 148 and may parse the NAL units to decode syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements obtained (e.g., extracted) from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive blocks (e.g., predictive luma, Cb and Cr blocks) for the PU.

Reconstruction unit 158 may use the transform blocks (e.g., luma, Cb and Cr transform blocks) associated with TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) of the CU. For example, reconstruction unit 158 may add samples of the transform blocks (e.g., luma, Cb and Cr transform blocks) to corresponding samples of the predictive blocks (e.g., predictive luma, Cb and Cr blocks) to reconstruct the coding blocks (e.g., luma, Cb and Cr coding blocks) of the CU.

Filter unit 160 may perform a deblocking operation to reduce blocking artifacts associated with the coding blocks (e.g., luma, Cb and Cr coding blocks) of the CU. Video decoder 30 may store the coding blocks (e.g., luma, Cb and Cr coding blocks) of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks (e.g., luma, Cb and Cr blocks) in decoded picture buffer 162, intra prediction or inter prediction operations on PUs of other CUs. In this way, video decoder 30 may extract, from the bitstream, transform coefficient levels of a significant coefficient block, inverse quantize the transform coefficient levels, apply a transform to the transform coefficient levels to generate a transform block, generate, based at least in part on the transform block, a coding block, and output the coding block for display.

In accordance with various examples of this disclosure, video decoder 30 may be configured to perform palette-based coding. Palette-based decoding unit 165, for example, may perform palette-based decoding when a palette-based decoding mode is selected, e.g., for a CU or PU. For example, palette-based decoding unit 165 may be configured to generate a palette having entries indicating pixel values. Furthermore, in this example, palette-based decoding unit 165 may receive information associating at least some positions of a block of video data with entries in the palette. In this example, palette-based decoding unit 165 may select pixel values in the palette based on the information. Additionally, in this example, palette-based decoding unit 165 may reconstruct pixel values of the block based on the selected pixel values. Although various functions are described as being performed by palette-based decoding unit 165, some or all of such functions may be performed by other processing units, or a combination of different processing units.

Palette-based decoding unit 165 may receive palette coding mode information, and perform the above operations when the palette coding mode information indicates that the palette coding mode applies to the block. When the palette coding mode information indicates that the palette coding mode does not apply to the block, or when other mode information indicates the use of a different mode, palette-based decoding unit 165 decodes the block of video data using a non-palette based coding mode, e.g., such an HEVC inter-predictive or intra-predictive coding mode, when the palette coding mode information indicates that the palette coding mode does not apply to the block. The block of video data may be, for example, a CU or PU generated according to an HEVC coding process. A video decoder 30 may decode some blocks with inter-predictive temporal prediction or intra-predictive spatial coding modes and decode other blocks with the palette-based coding mode. The palette-based coding mode may comprise one of a plurality of different palette-based coding modes, or there may be a single palette-based coding mode.

According to one or more of the techniques of this disclosure, video decoder 30, and specifically palette-based decoding unit 165, may perform palette-based video decoding of palette-coded video blocks. As described above, a palette decoded by video decoder 30 may be explicitly encoded and signaled by video encoder 20, reconstructed by video decoder 30 with respect to a received palette-coded block, predicted from previous palette entries, predicted from previous pixel values, or a combination thereof.

As described above, if a palette-coded video block satisfies a particular set of conditions, video encoder 20 (and various component thereof, such as palette-based encoding unit 122) may bypass encoding and signaling of a map of palette index values for the pixels of the block. In examples where video encoder 20 bypasses encoding and signaling of the map of palette index values for a single color block that is palette-coded, video decoder 30 (and specific components thereof, such as palette-based decoding unit 165) may apply various techniques of this disclosure to reconstruct the single color block. In some examples, palette-based decoding unit 165 may perform operations reciprocal to those described above with respect to palette-based encoding unit 122 of video encoder 20, to determine that the palette-coded block is a single color block. For instance, palette-based decoding unit 165 may determine that the palette for the current block has a size of one, thereby determining that the block satisfies the first condition to qualify as a single color block. In various examples, video decoder 30 may receive the palette in an encoded video bitstream from video encoder 20, or may derive the palette using various other data included in the encoded video bitstream.

Additionally, video decoder 30 may determine that the block does not include any escape pixels, thereby determining that the block satisfies the second condition to qualify as a single color block. Based on determining that the size of the palette for the block is one (thus satisfying the first condition), and that the block does not include any escape pixels (thus satisfying the second condition), palette-based decoding unit 165 may implement techniques of this disclosure to determine that the current block is a single color block. In turn, palette-based decoding unit 165 may reconstruct the single color block by reconstructing all pixels of the single color block according to the color information indicated in the single entry of the corresponding palette. In this manner, palette-based decoding unit 165 may implement techniques of this disclosure to reconstruct a palette-coded block accurately, while conserving computing resources and bandwidth that would otherwise be required to reconstruct the block by relying on a map of palette index values for all pixels of the block.

In some examples, video decoder 30 may receive, in the encoded video bitstream, a flag that indicates whether video encoder 20 bypassed encoding and signaling of the map of palette index values for one or more pixels of a palette-encoded block, in accordance with techniques of this disclosure. In cases where video decoder 30 receives a flag indicating that video encoder 20 did bypass encoding and signaling of the map of palette index values for the palette-encoded block, palette-based decoding unit 165 may implement techniques of this disclosure to determine that the current block is palette-coded, and is a single color block. More specifically, if the flag is enabled (e.g., set to a value of one), palette-based decoding unit 165 may determine that the palette-coded block is a single color block. In turn, palette-based decoding unit 165 may implement techniques of this disclosure to reconstruct all pixels of the block according to the color information of the single entry in the palette for the block. Thus, palette-based decoding unit 165 may implement techniques of this disclosure to accurately reconstruct the palette-encoded block using a one-bit flag for the entire block, rather than using separate index values (of varying bitdepth) for different pixels, or groups of pixels (e.g. a line), of the block. In this manner, palette-based decoding unit 165 may conserve computing resource expenditure at video decoder 30 in reconstructing single color palette-coded blocks, and may reduce the bandwidth required by video decoder 30 to receive the data necessary to reconstruct the single color palette coded blocks, while maintaining precision and picture quality.

As described, video encoder 20 (and components thereof, such as palette-based encoding unit 122 and/or quantization unit 106) may implement certain techniques of this disclosure to quantize escape pixel values of a palette-coded block with enhanced computing efficiency. Video decoder 30 (and various components thereof, such as palette-based decoding unit 165 and/or inverse quantization unit 154) may perform reciprocal operations to those described above with respect to video encoder 20, to dequantize escape pixels in accordance with various techniques of this disclosure. For instance, inverse quantization unit 154 may dequantize all escape pixels of a single color channel using the same QP value, based on information received in the encoded video bitstream from video encoder 20. More specifically, in accordance with aspects of this disclosure, inverse quantization unit 154 may dequantize any escape pixels (or prediction errors/residual values thereof) communicated over a particular color channel, using a QP value that is determined based on the QP value for traditional transform coefficient dequantization for blocks communicated over the current color channel. In some examples, inverse quantization unit 154 may implement the techniques of this disclosure to dequantize escape pixels communicated over different color channels using different QP values, based on the QP value used for traditional transform coefficient coding being different among the different channels.

In this manner, video decoder 30 may implement the techniques described herein to define and apply a single QP value (to dequantize) all escape pixels communicated over a particular color channel. Thus, video decoder 30 may apply aspects of this disclosure to define a QP value for escape pixels detected through palette-based coding, where existing palette-based coding techniques did not define a QP value for escape pixels.

In some examples, components of video decoder 30, such as inverse quantization unit 154, may implement techniques of this disclosure to perform reciprocal operations of those described above with respect to video encoder 20 (and/or components thereof, such as quantization unit 106), to dequantize a quantized escape pixel value. For instance, inverse quantization unit 154 may implement techniques of this disclosure to calculate a shift amount (e.g., for a corresponding left-shift operation) based on a QP value in dequantizing the corresponding quantized escape pixel value. In this manner, inverse quantization unit 154 may also apply aspects of this disclosure to conserve computing resources, such as storage utilization, by leveraging a function instead of storing a 52-entry mapping table.

Figure 4:
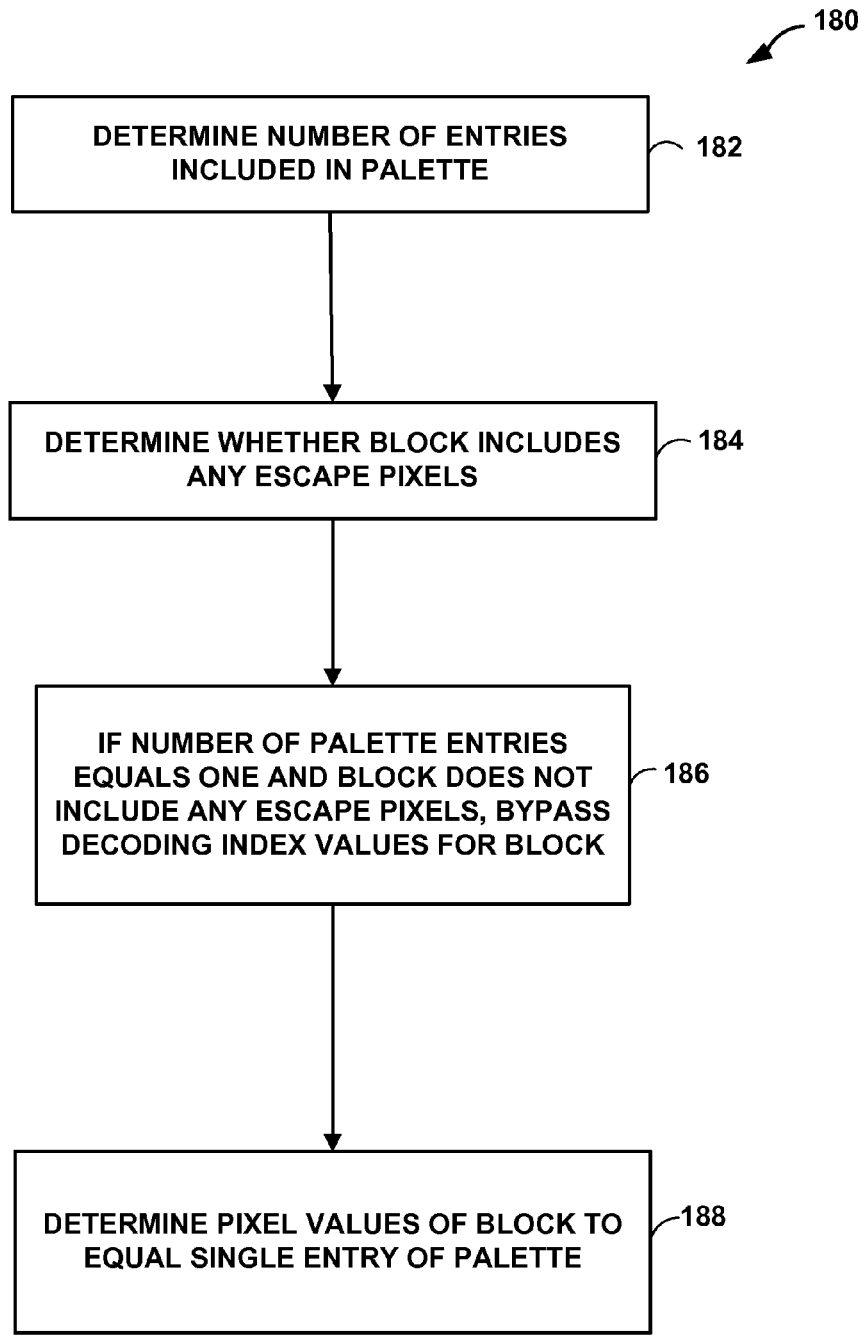
FIG. 4 is a flowchart illustrating an example process by which a video decoding device may implement techniques of this disclosure to bypass decoding of index values for pixels of a palette-coded block, based on a particular set of conditions.

FIG. 4 is a flowchart illustrating an example process 180 by which a video decoding device may implement techniques of this disclosure to bypass decoding of index values for pixels of a palette-coded block, based on a particular set of conditions. While process 180 may be performed by a variety of devices in accordance with aspects of this disclosure, process 180 is described herein with respect to video decoder 30 of FIGS. 1 and 3, for the purpose of ease of description. Process 180 may begin when video decoder 30 determines a number of entries included in a palette used to represent pixel values of a block of video data to be decoded (182). Additionally, video decoder 30 may determine whether the block of video data includes at least one escape pixel that is not associated with any of the entries of the palette (184). For instance, if the color information of a pixel of the block does not map to any entry of the palette, video decoder 30 may identify such a pixel as an escape pixel. In various examples, video decoder 30 may identify the escape pixel using a flag signaled by video encoder 20 or by an index value (e.g., "other index" described above) signaled by video encoder 20.

In turn, video decoder 30 may, responsive to determining that the number of entries included in the palette is equal to one and that the block of video data does not include at least one escape pixel, bypass decoding of index values associated with the palette for the pixel values of the block of video data (186). As one example, video decoder 30 may receive, as part of an encoded video bitstream, encoded video data, e.g., syntax elements and/or flags, associated with the block of video data, wherein the encoded video data associated with the block does not include index values associated with the palette for the pixel values of the block. Additionally, video decoder 30 may determine the pixel values of the block of video data to be equal to the one entry included in the palette (188). For instance, video decoder 30 may reconstruct the block by assigning all pixels of the block the color information indicated by the single entry of the palette.

In one example, video decoder 30 may further receive, as part of an encoded video bitstream, a flag that indicates whether the index values are encoded for the block of video data. In one example, to determine the number of entries included in the palette, video decoder 30 may receive, as part of an encoded video bitstream, a flag that indicates whether the number of entries in the palette is equal to one. In one example, to determine whether the block of video data includes at least one escape pixel, video decoder 30 may receive, as part of an encoded video bitstream, a flag that indicates whether the block of video data includes at least one escape pixel. In one example, video decoder 30 may receive, as part of an encoded video bitstream, one or more syntax elements associated with the palette. In this example, video decoder 30 may decode the one or more syntax elements associated with the palette.

Figure 5:
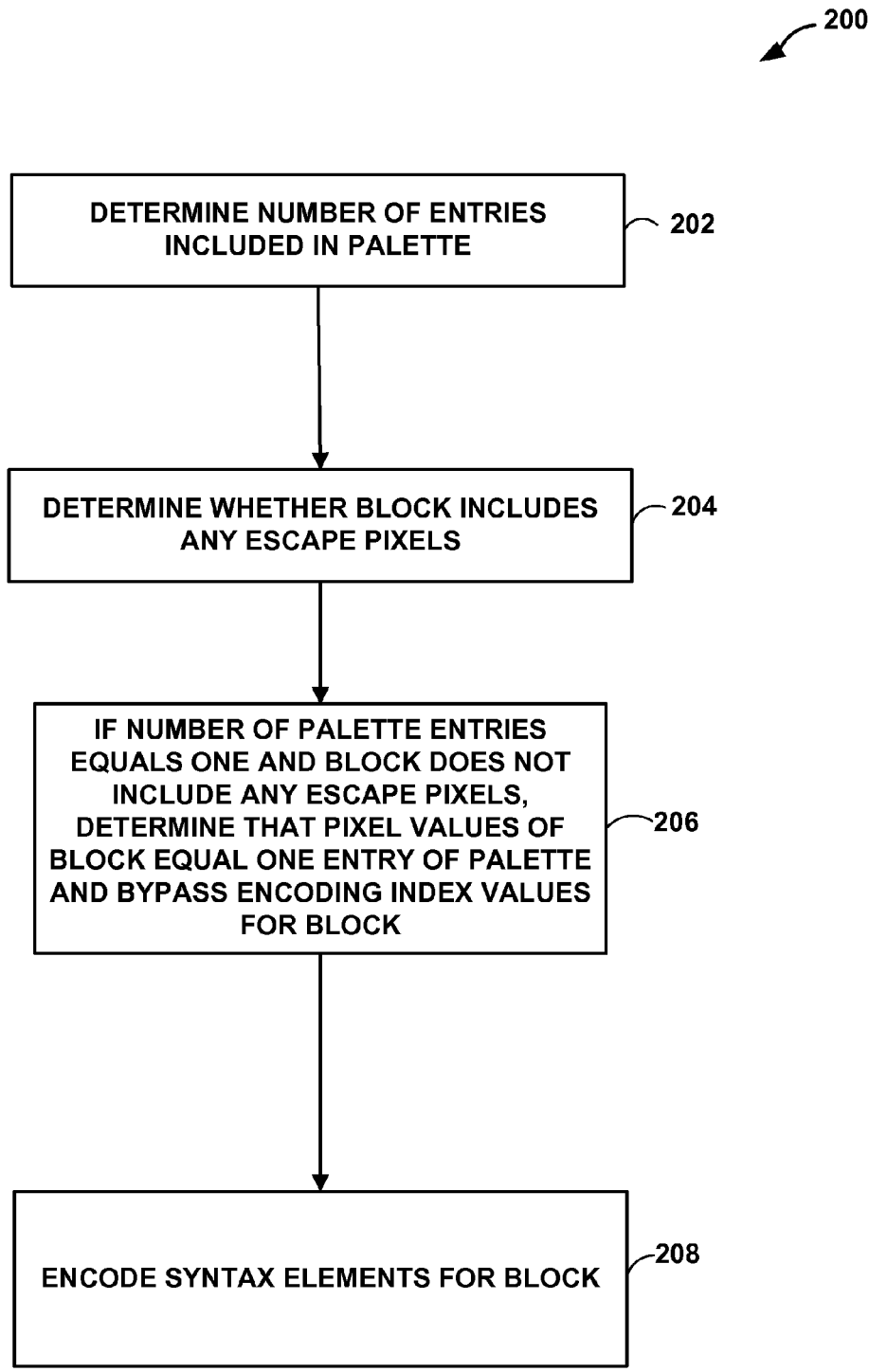
FIG. 5 is a flowchart an example process by which a video encoding device may implement techniques of this disclosure to bypass encoding of index values for pixels of a palette-coded block, based on a particular set of conditions.

FIG. 5 is a flowchart illustrating an example process 200 by which a video encoding device may implement techniques of this disclosure to bypass encoding of index values for pixels of a palette-coded block, based on a particular set of conditions. While process 200 may be performed by a variety of devices in accordance with aspects of this disclosure, process 200 is described herein with respect to video encoder 20 of FIGS. 1 and 2, for the purpose of ease of description. Process 200 may begin when video encoder 20 determines a number of entries included in a palette used to represent pixel values of a block of video data to be encoded (202). Additionally, video encoder 20 may determine whether the block of video data includes at least one escape pixel that is not associated with any of the entries in palette (204).

In turn, video encoder 20 may, responsive to determining that the number of entries included in the palette is equal to one and that the block of video data does not include at least one escape pixel, determine that the pixel values of the block are equal to the one entry of the palette, and bypass encoding of index values associated with the palette for the pixel values of the block of video data (206). For instance, video encoding device 20 may encode data, e.g., syntax elements and/or flags, for the block without encoding index values mapping pixel values of the block to entries in the palette corresponding to the block. Additionally, video encoding device 20 may encode one or more syntax elements associated with the block of video data (208).

In one example, to encode the one or more syntax elements, video encoder 20 may encode, as part of an encoded video bitstream, a flag that indicates whether the index values are encoded for the pixel values of the block of video data. In one example, to encode the one or more syntax elements, video encoder 20 may encode, as part of an encoded video bitstream, a flag that indicates whether the size of the palette is equal to one. In one example, to encode the one or more syntax elements, video encoder 20 may encode, as part of an encoded video bitstream, a flag that indicates whether the block of video data includes at least one escape pixel. In one example, video encoder 20 may encode one or more syntax elements associated with the palette. In this example, video encoder 20 may signal, as part of an encoded video bitstream, the one or more syntax elements associated with the palette.

Figure 6:
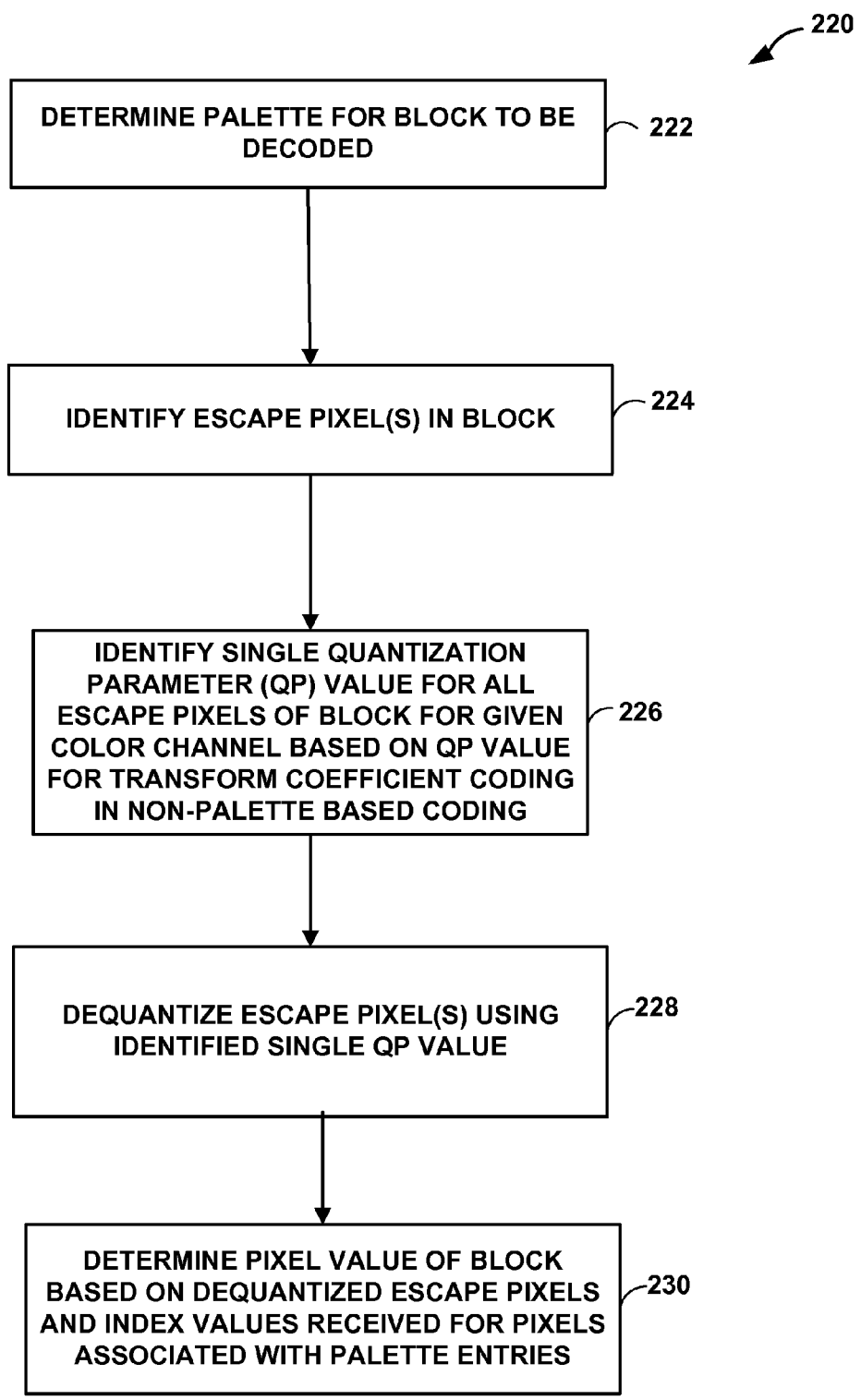
FIG. 6 is a flowchart illustrating an example process by which a video decoding device may implement techniques of this disclosure to dequantize one or more escape pixels of a palette-coded block of video data.

FIG. 6 is a flowchart illustrating an example process 220 by which a video decoding device may implement techniques of this disclosure to dequantize one or more escape pixels of a palette-coded block of video data. While process 220 may be performed by a variety of devices in accordance with aspects of this disclosure, process 220 is described herein with respect to video decoder 30 of FIGS. 1 and 3, for the purpose of ease of description. Process 220 may begin when video decoder 30 determines a palette used to represent pixel values of a block of video data to be decoded (222). Additionally, video decoder 30 may identify, in the block of video data, one or more escape pixels that are not associated with any of one or more entries in the palette (224).

In turn, video decoder 30 may identify a single quantization parameter (QP) value for all of the one or more escape pixels of the block for a given color channel based on a QP value used for transform coefficient coding in non-palette based coding (226). For instance, video decoder 30 may determine that the single QP value is equal to a QP value used for traditional coefficient decoding of a color channel associated with the block. Additionally, video decoder 30 may dequantize each of the one or more escape pixels using the identified single QP value (228). In turn, video decoder 30 may determine the pixel values for the block of video data based on the dequantized escape pixels and index values received for one or more pixels in the block of video data that are associated with the one or more entries in the palette (230).

In one example, any two entries of the palette vary by at least a palette error limit. In one example, the palette error limit is directly proportional to a palette QP value associated with the block. In one example, to identify the one or more escape pixels, video decoder 30 may receive, in an encoded video bitstream, a one-bit flag associated with each of the one or more escape pixels, and determine, based on a value of each received one-bit flag, that each of the one or more escape pixels is not associated with any of the entries of the palette. In one example, to determine that each of the one or more escape pixels is not associated with any of the entries of the palette, video decoder 30 may determine that each of the one or more escape pixels is not associated with any of the entries of the palette based on the value of each received one-bit flag and without decoding a pre-defined other index value associated with escape pixels.

Figure 7:
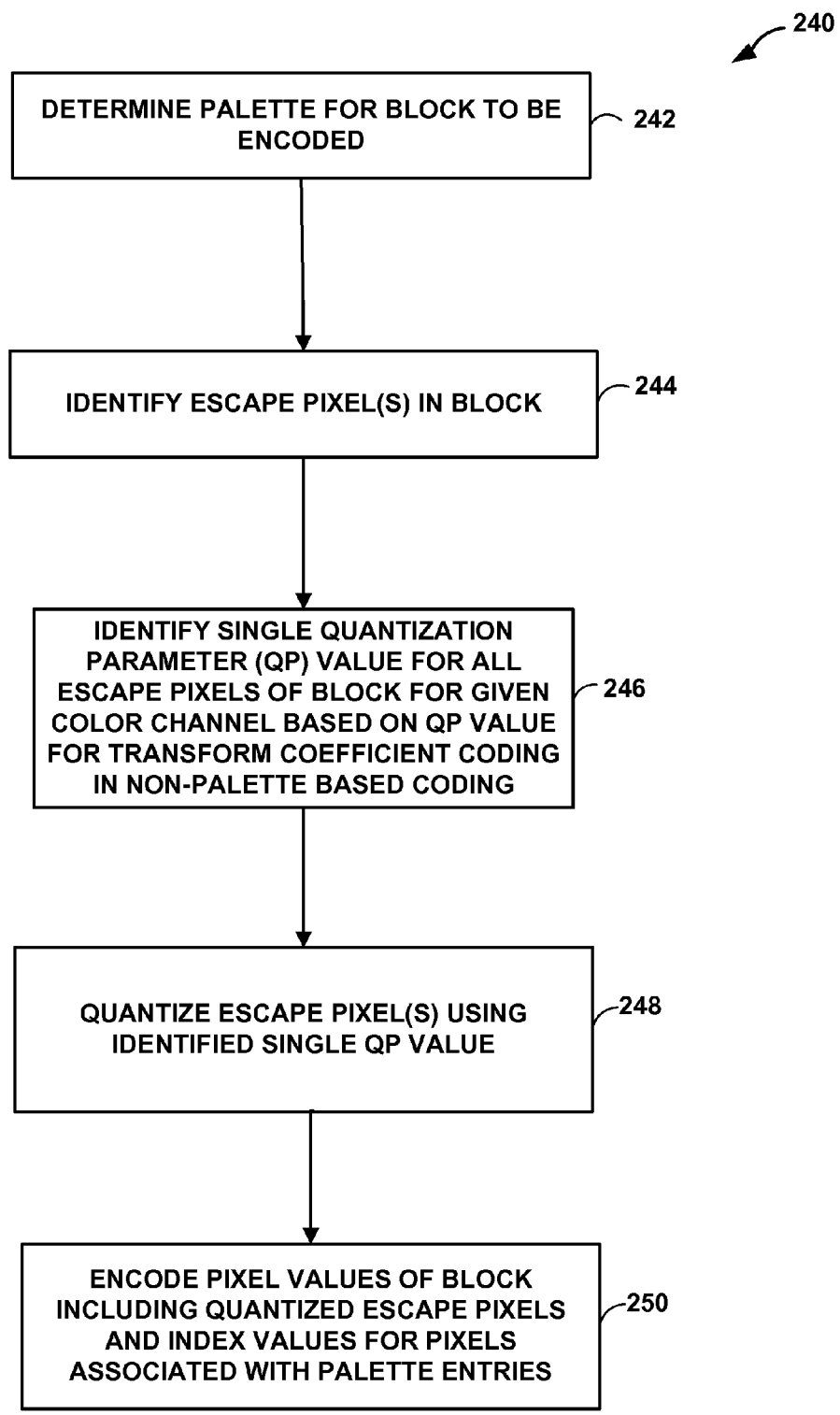
FIG. 7 is a flowchart illustrating an example process by which a video encoding device may implement techniques of this disclosure to quantize one or more escape pixels of a palette-coded block of video data.

FIG. 7 is a flowchart illustrating an example process 240 by which a video encoding device may implement techniques of this disclosure to quantize one or more escape pixels of a palette-coded block of video data. While process 240 may be performed by a variety of devices in accordance with aspects of this disclosure, process 240 is described herein with respect to video encoder 20 of FIGS. 1 and 2, for the purpose of ease of description. Process 240 may begin when video encoder 20 determines a palette used to represent pixel values of a block of video data to be encoded (242). Additionally, video encoder 20 may identify, in the block of video data, one or more escape pixels that are not associated with any of one or more entries in the palette (244).

In turn, video encoder 20 may identify a single quantization parameter (QP) value for all of the one or more escape pixels of the block (246). For instance, video encoder 20 may determine that the single QP value is equal to a QP value used for traditional coefficient encoding of a color channel associated with the block. Additionally, video encoder 20 may quantize each of the one or more escape pixels using the identified single QP value (248).

In one example, to identify the single QP value, video encoder 20 may determine that the single QP value is equal to a QP value used for traditional coefficient encoding of a color channel associated with the block. In one example, video encoder 20 may determine that a palette error limit of the palette is directly proportional to a QP value associated with the block, where any two entries of the palette are vary by at least a palette error limit. In one example, to determine the palette error limit, video encoder 20 may identify the palette error limit using a table that maps the palette error limit to the QP value associated with the block. In one example, video encoder 20 may encode a one-bit flag associated with each of the one or more escape pixels without encoding a pre-defined other index value associated with escape pixels, wherein a value of each one-bit flag indicates that a respective one of the one or more escape pixels is not associated with any of the entries of the palette. In one example, to quantize each of the one or more escape pixels using the identified single QP value, video encoder 20 may solve a function that is based on the identified single QP value. In one such example, to solve the function, video encoder 20 may perform a right-shift operation that is based on the identified single QP value.

In some examples, the techniques for palette-based coding of video data may be used with one or more other coding techniques, such as techniques for inter- or intra-predictive coding. For example, as described in greater detail below, an encoder or decoder, or combined encoder-decoder (codec), may be configured to perform inter- and intra-predictive coding, as well as palette-based coding.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

Certain aspects of this disclosure have been described with respect to the developing HEVC standard for purposes of illustration. However, the techniques described in this disclosure may be useful for other video coding processes, including other standard or proprietary video coding processes not yet developed.

The techniques described above may be performed by video encoder 20 (FIGS. 1 and 2) and/or video decoder 30 (FIGS. 1 and 3), both of which may be generally referred to as a video coder. Likewise, video coding may refer to video encoding or video decoding, as applicable.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding encoded video data, the method comprising:
   receiving an encoded video bitstream that includes data representing an encoded block of the video data to be decoded, wherein the encoded block is encoded according to palette-based coding;
   parsing the received encoded video bitstream to obtain first data indicating a number of entries included in a palette used to represent pixel values of the encoded block of video data to be decoded;
   parsing the received encoded video bitstream to obtain second data indicating whether the encoded block of video data includes at least one escape pixel that is not represented by any entry included in the palette;
   determining, from the first data, that the number of entries included in the palette is equal to one;
   determining, from the second data, that the encoded block of video data includes no escape pixel;
   based on determining that the number of entries included in the palette is equal to one and that the encoded block of video data includes no escape pixel, bypassing decoding of index values for the pixel values of the encoded block of video data, the index values being associated with the entries of the palette;
   without decoding the index values for the pixel values of the encoded block of video data, determining that all pixel values of the encoded block of video data are equal to the one entry included in the palette; and
   reconstructing the encoded block by assigning a respective value indicated by the one entry of the palette to every pixel value of the pixel values of the encoded block of video data.

2. The method of claim 1, further comprising receiving, as part of the encoded video bitstream, a one-bit flag that indicates whether the index values are encoded for the block of video data.

3. The method of claim 1, wherein
   the first data comprises a one-bit flag that indicates whether the number of entries in the palette is equal to one.

4. The method of claim 1, wherein
   the second data comprises a one-bit flag that indicates whether the encoded block of video data includes at least one escape pixel.

5. The method of claim 1, further comprising:
   receiving, as part of the encoded video bitstream, one or more syntax elements associated with the palette; and
   decoding the one or more syntax elements associated with the palette.

6. A method of encoding video data, the method comprising:
   determining a number of entries included in a palette used to represent pixel values of a block of video data to be encoded according to palette-based coding;
   determining whether the block of video data includes at least one escape pixel that is not represented by any entry included in the palette;
   based on determining that the number of entries included in the palette is equal to one and that the block of video data does includes no escape pixel, determining that all pixel values of the block of video data are equal to the one entry included in the palette;
   bypassing encoding of index values for the pixel values of the block of video data, the index values being associated with the entries of the palette;
   encoding the block of video data to form an encoded block of video data, by assigning a respective value indicated by the one entry of the palette to every pixel value of the pixel values of the encoded block of video data; and
   signaling the encoded block of video data in an encoded video bitstream.

7. The method of claim 6, further comprises signaling, as part of the encoded video bitstream, a one-bit flag that indicates whether the index values are encoded for the pixel values of the block of video data.

8. The method of claim 6, further comprising signaling, as part of the encoded video bitstream, a one-bit flag that indicates that the number of entries included in the palette is equal to one.

9. The method of claim 6, further comprising signaling, as part of the encoded video bitstream, a one-bit flag that indicates that the encoded block of video data includes no escape pixel.

10. The method of claim 6, further comprising:
encoding one or more syntax elements associated with the palette; and
signaling, as part of the encoded video bitstream, the one or more syntax elements associated with the palette.

11. A device for decoding video data, the device comprising:
a memory configured to store an encoded video bitstream that includes data representing an encoded block of the video data to be decoded, wherein the encoded block is encoded according to palette-based coding; and
one or more processors in communication with the memory and configured to:
parse the stored encoded video bitstream to obtain first data indicating a number of entries included in a palette used to represent pixel values of the encoded block of video data to be decoded;
parse the stored encoded video bitstream to obtain second data indicating whether the encoded block of video data includes at least one escape pixel that is not represented by any entry included in the palette;
determine, from the first data, that the number of entries included in the palette is equal to one;
determine, from the second data, that the encoded block of video data includes no escape pixel;
based on the determination that the number of entries included in the palette is equal to one and that the encoded block includes no escape pixel, bypass decoding of index values for the pixel values of the encoded block, the index values being associated with the entries of the palette;
determine that all pixel values of the encoded block are equal to the one entry included in the palette without decoding the index values for the pixel values of the encoded block; and
reconstruct the encoded block by assigning a respective value indicated by the one entry of the palette to every pixel value of the pixel values of the encoded block.

12. The device of claim 11,
wherein the encoded video bitstream stored to the memory includes a one-bit flag that indicates whether index values are encoded for the encoded block, and
wherein the one or more processors are further configured to determine a value of a the one-bit flag to determine whether the index values are encoded for the encoded block.

13. The device of claim 12, further comprising:
an interface device configured to receive the encoded video bitstream.

14. The device of claim 11, wherein the first data comprises a one-bit flag that indicates whether the size of the palette is equal to one.

15. The device of claim 11, wherein the second data comprises a one-bit flag that indicates whether the encoded block includes at least one escape pixel.

16. A non-transitory computer-readable storage medium encoded with instructions that, when executed, cause one or more processors of a device for decoding encoded video data to:
receive an encoded video bitstream that includes data representing an encoded block of the encoded video data to be decoded, wherein the encoded block is encoded according to palette-based coding;
parse the received encoded video bitstream to obtain first data indicating a number of entries included in a palette used to represent pixel values of the encoded block of video data to be decoded;
parse the received encoded video bitstream to obtain second data indicating whether the encoded block of video data includes at least one escape pixel that is not represented by any entry included in the palette;
determine, from the first data, that the number of entries included in the palette is equal to one;
determine, from the second data, that the encoded block includes no escape pixel;
based on the determination that the number of entries included in the palette is equal to one and that the encoded block of video data includes no escape pixel, bypass decoding of index values for the pixel values of the encoded block, the index values being associated with the entries of the palette;
determine that all pixel values of the encoded block are equal to the one entry included in the palette without decoding the index values for the pixel values of the encoded block; and
reconstruct the encoded block by assigning a respective value indicated by the one entry of the palette to every pixel value of the pixel values of the encoded block of video data.

17. The non-transitory computer-readable storage medium of claim 16, further encoded with instructions that, when executed, cause the one or more processors to determine a value of a one-bit flag included in the encoded video bitstream, wherein the value of the one-bit flag indicates whether the index values are encoded for the encoded block.

18. The non-transitory computer-readable storage medium of claim 16, wherein the first data comprises a one-bit flag that indicates whether the number of entries in the palette is equal to one.

19. An apparatus for decoding encoded video data, the apparatus comprising:
means for receiving an encoded video bitstream that includes data representing an encoded block of the encoded video data to be decoded, wherein the encoded block is encoded according to palette-based coding;
means for parsing the received encoded video bitstream to obtain first data indicating a number of entries included in a palette used to represent pixel values of the encoded block of the encoded video data to be decoded;
means for parsing the received encoded video bitstream to obtain second data indicating whether the encoded block of the encoded video data includes at least one escape pixel that is not represented by any entry included in the palette;
means for determining, from the first data, that the number of entries included in the palette is equal to one;
means for determining, from the second data, that the encoded block of the encoded video data includes no escape pixel;
means for bypassing, based on the determinations that that the number of entries included in the palette is equal to one and that the encoded block of the encoded video data includes no escape pixel, decoding of index values for the pixel values of the encoded block of the encoded video data, the index values being associated with the entries of the palette;
means for determining, without decoding the index values for the pixel values of the encoded block of video data, that all pixel values of the encoded block of the encoded video data are equal to the one entry included in the palette; and means for reconstructing the encoded block of the encoded video data by assigning a respective value indicated by the one entry of the palette to every pixel value of the pixel values of the encoded block of the encoded video data.

20. The device of claim 11, further comprising at least one of:
- one or more integrated circuits;
- one or more microprocessors;
- one or more digital signal processors (DSPs);
- one or more field programmable gate arrays (FPGAs);
- a desktop computer;
- a laptop computer;
- a tablet computer;
- a phone;
- a television;
- a camera;
- a display device;
- a digital media player;
- a video game console;
- a video game device;
- a video streaming device; or
- a wireless communication device.

* * * * *